United States Patent
Thomson et al.

(10) Patent No.: US 11,691,490 B2
(45) Date of Patent: Jul. 4, 2023

(54) SEAL ASSEMBLY

(71) Applicant: Henniges Automotive Sealing Systems North America, Inc., Wilmington, DE (US)

(72) Inventors: Matt Thomson, Reidsville, NC (US); Robert B. Krueger, Grosse Ile, MI (US); Steven Paul Iatrow, Livonia, MI (US)

(73) Assignee: Henniges Automotive Sealing Systems North America, Inc., Wilmington, DE (US)

( * ) Notice: Subject to any disclaimer, the term of this patent is extended or adjusted under 35 U.S.C. 154(b) by 825 days.

(21) Appl. No.: 16/612,271

(22) PCT Filed: May 11, 2018

(86) PCT No.: PCT/US2018/032357
§ 371 (c)(1),
(2) Date: Nov. 8, 2019

(87) PCT Pub. No.: WO2018/209261
PCT Pub. Date: Nov. 15, 2018

(65) Prior Publication Data
US 2020/0062096 A1 Feb. 27, 2020

Related U.S. Application Data

(60) Provisional application No. 62/504,957, filed on May 11, 2017.

(51) Int. Cl.
B29C 48/18 (2019.01)
B60J 10/88 (2016.01)
(Continued)

(52) U.S. Cl.
CPC ......... B60J 10/88 (2016.02); B29C 45/14467 (2013.01); B29C 48/0022 (2019.02);
(Continued)

(58) Field of Classification Search
CPC ... B60J 10/32; B60J 10/88; B60J 10/45; B60J 10/18; B29C 65/48; B29C 48/18; B29C 48/0022; B29C 45/14467; B29L 2031/26
See application file for complete search history.

(56) References Cited

U.S. PATENT DOCUMENTS 3,958,369 A  5/1976  Mathellier
5,035,937 A  7/1991  Nozaki
(Continued)

FOREIGN PATENT DOCUMENTS

CN  211492602 U  9/2020
DE  2460417 A1  7/1975
(Continued)

OTHER PUBLICATIONS

English language abstract not found for DE 24 60 417 A1; however, see English language equivalent U.S. Pat. No. 3,958,369. Original document extracted from espacenet.com database on Aug. 21, 2021, 6 pages.
(Continued)

*Primary Examiner* — Monica A Huson
(74) *Attorney, Agent, or Firm* — Howard & Howard Attorneys PLLC

(57) ABSTRACT

A seal assembly includes a body portion defining a mounting channel for receiving a vehicle flange. A base of the body portion defines an outer surface of the body portion with the outer surface defining a first axis of curvature adapted to correspond with a contour of the flange. The seal assembly further includes a sealing lip portion co-extruded with the body portion and defining a notch having a notch configu-
(Continued)

ration, an element disposed in the notch and pre-formed to have an element configuration corresponding to at least a part of the notch configuration, and a molding material molded to a back surface of the element, secured to the sealing lip portion within the notch, and extending across the notch, with the element and the molding material defining a contour lip portion that in combination with the sealing lip portion defines an external sealing lip of the seal assembly.

19 Claims, 13 Drawing Sheets

(51) Int. Cl.
  *B60J 10/32* (2016.01)
  *B60J 10/00* (2016.01)
  *B29C 48/00* (2019.01)
  *B29C 45/14* (2006.01)
  *B29C 65/48* (2006.01)
  *B60J 10/18* (2016.01)
  *B29L 31/26* (2006.01)

(52) U.S. Cl.
  CPC .............. *B29C 48/18* (2019.02); *B29C 65/48* (2013.01); *B60J 10/32* (2016.02); *B60J 10/45* (2016.02); *B29L 2031/26* (2013.01); *B60J 10/18* (2016.02)

(56) References Cited

U.S. PATENT DOCUMENTS

| | | | |
|---|---|---|---|
| 5,839,232 | A | 11/1998 | Backes et al. |
| 5,976,438 | A | 11/1999 | Hamabata |
| 6,012,760 | A | 1/2000 | Nozaki |
| 6,212,851 | B1 | 4/2001 | Visconti et al. |
| 6,240,677 | B1 | 6/2001 | Baumann |
| 6,385,839 | B2 | 5/2002 | Kawai et al. |
| 6,647,666 | B2 | 11/2003 | Kawai et al. |
| 7,571,569 | B2 | 8/2009 | Hiramatsu et al. |
| 8,205,389 | B1 | 6/2012 | Kesh |
| 8,434,267 | B2 | 5/2013 | Bocutto |
| 9,027,284 | B2 | 5/2015 | Murree et al. |
| 9,708,846 | B2 | 7/2017 | Masumoto |
| 9,840,207 | B2 | 12/2017 | Blottiau |
| 11,130,394 | B2 | 9/2021 | Murar et al. |
| 2003/0205918 | A1 | 11/2003 | Carvalho et al. |
| 2004/0157013 | A1 | 8/2004 | Nakajima et al. |
| 2005/0097750 | A1 | 5/2005 | Masunaga |
| 2005/0208232 | A1 | 9/2005 | Kimura et al. |
| 2006/0150522 | A1 | 7/2006 | Boccuto |
| 2012/0240473 | A1 | 9/2012 | Minoura et al. |
| 2016/0288634 | A1 | 10/2016 | Sawada |
| 2017/0072777 | A1 | 3/2017 | Kawaguchi et al. |
| 2017/0100996 | A1 | 4/2017 | Husek et al. |
| 2020/0156451 | A1 | 5/2020 | Miyata |

FOREIGN PATENT DOCUMENTS

| | | | |
|---|---|---|---|
| DE | 60021910 | T2 | 4/2006 |
| EP | 1935694 | A1 | 6/2008 |
| FR | 2898181 | A1 | 9/2007 |
| FR | 3078039 | A1 | 8/2019 |
| JP | 2007161080 | A | 6/2007 |
| JP | 6602632 | B2 | 11/2019 |
| WO | 2018054661 | A1 | 3/2018 |

OTHER PUBLICATIONS

English language abstract for DE 600 21 910 T2 extracted from espacenet.com database on Aug. 21, 2021, 1 page.
English language abstract for FR 2 898 181 A1 extracted from espacenet.com database on Aug. 21, 2021, 1 page.
Machine-assisted English language abstract for FR 3 078 039 A1 extracted from espacenet com database on Aug. 21, 2021, 2 pages.
International Search Report for Application No. PCT/US2018/032357 dated Jul. 18, 2018, 1 page.
English language abstract for WO 2018/054661 extracted from espacenet.com database on Nov. 21, 2019, 2 pages.
English language abstract for CN 211492602 U extracted from espacenet.com database on Oct. 3, 2022, 1 page.
English language abstract for JP 6602632 B2 extracted from espacenet.com database on Oct. 3, 2022, 1 page.
English language abstract for EP 1 935 694 A1 extracted from espacenet com database on Sep. 25, 2022, 1 page.
English language abstract for JP 2007-161080 A extracted from espacenet com database on Sep. 25, 2022, 1 page.
Chinese Search Report for Application CN 2018800305627 dated Aug. 26, 2022, 2 pages.

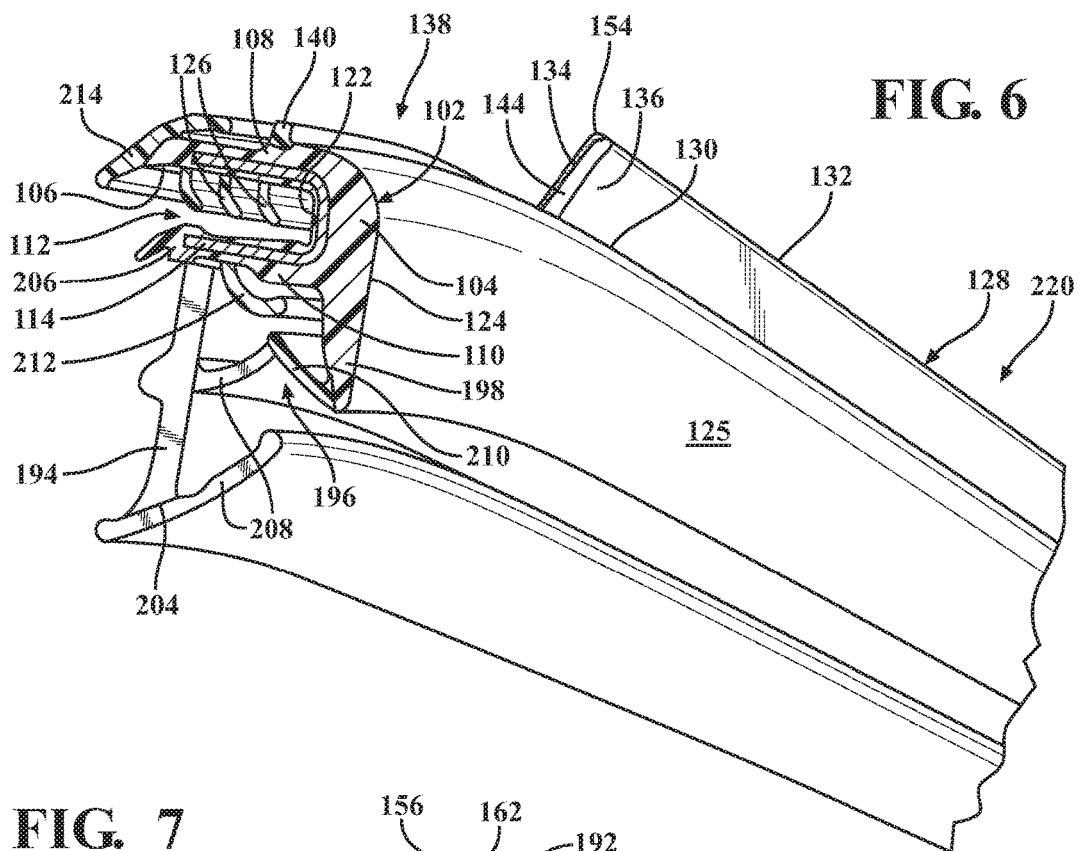
FIG. 6
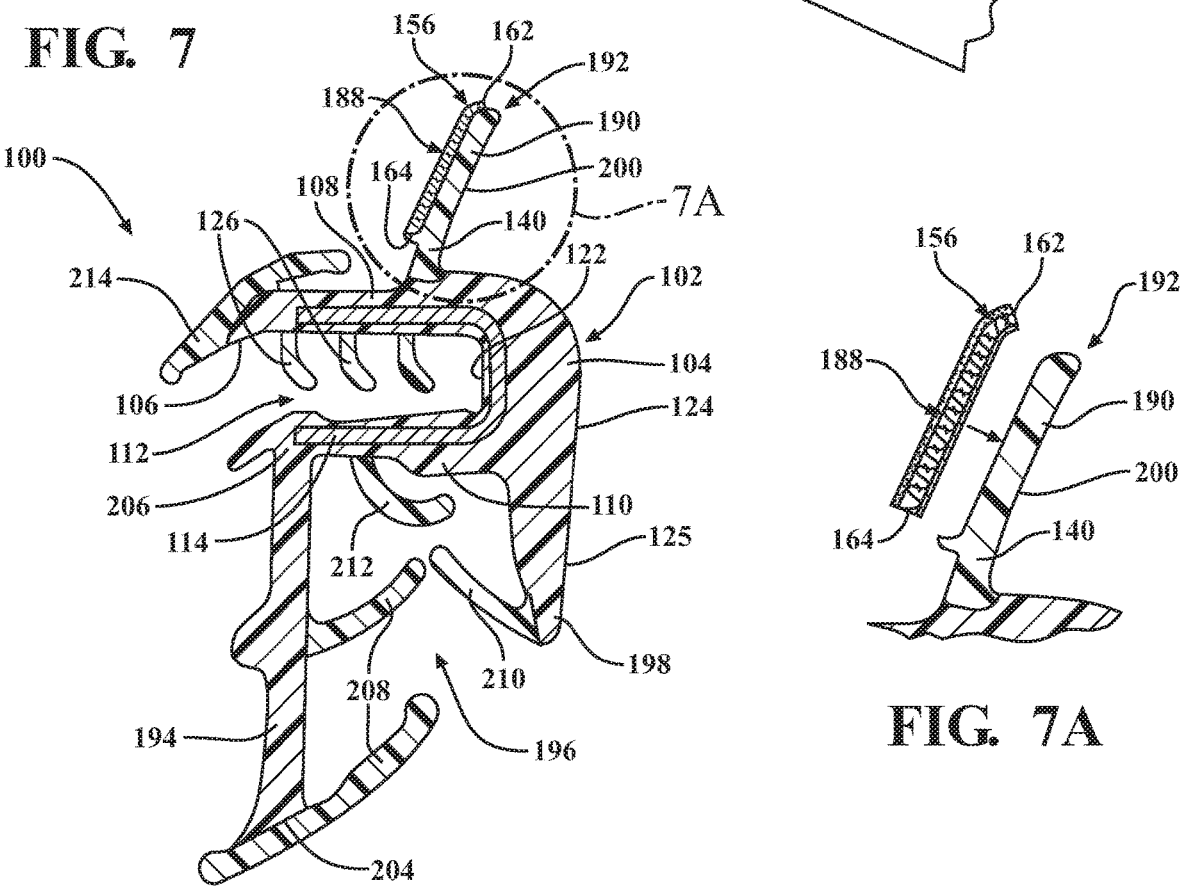
FIG. 7
FIG. 7A

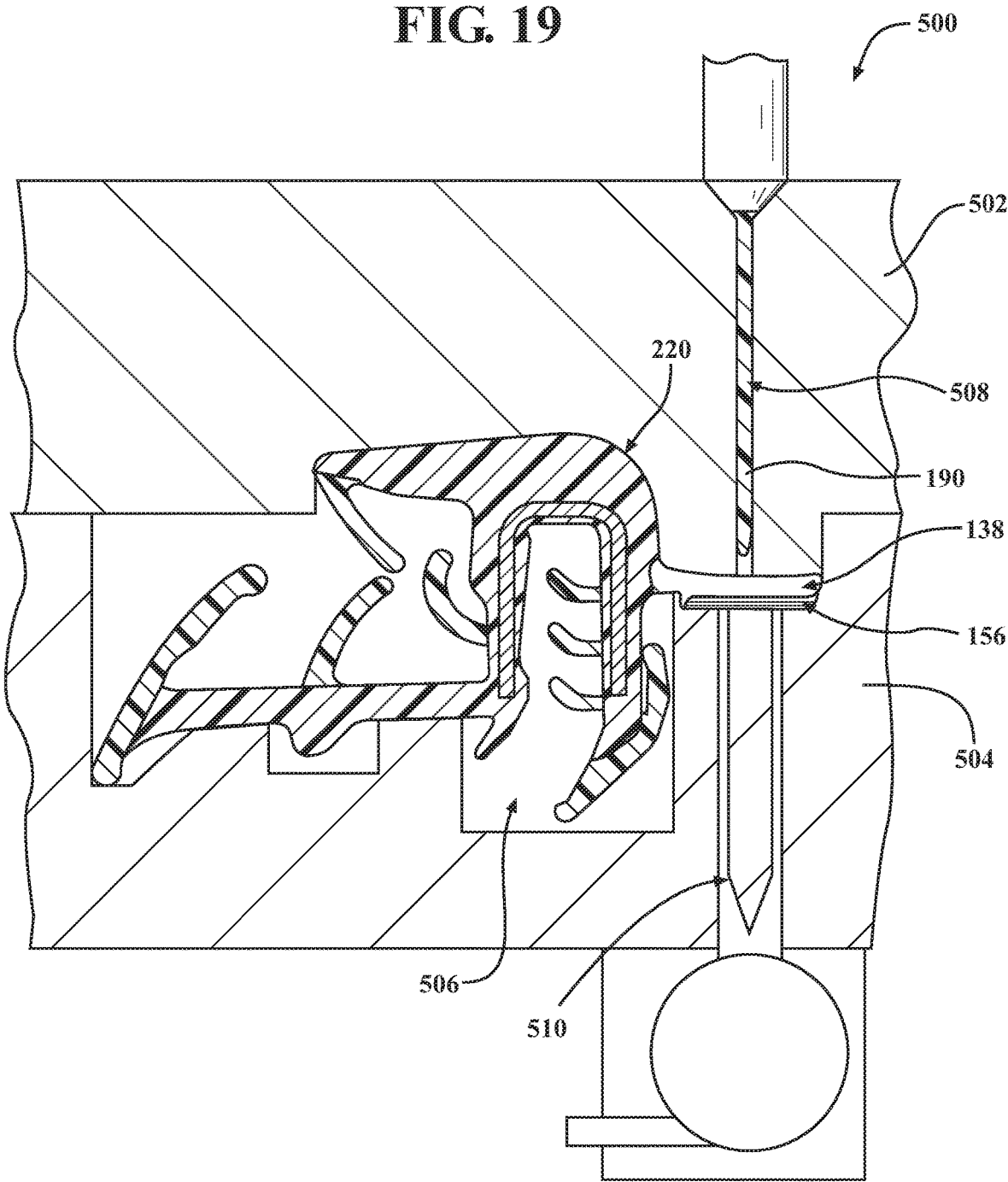

SEAL ASSEMBLY

CROSS REFERENCE TO RELATED APPLICATION

The subject application is the National Stage of International Patent Application No. PCT/US2018/032357, filed May 11, 2018, which claims priority to and all the benefits of U.S. Provisional Application 62/504,957, filed on May 11, 2017, the contents of which are incorporated herein by reference in their entirety.

FIELD OF THE DISCLOSURE

The present disclosure relates generally to a seal assembly adapted to be coupled to a flange of a vehicle.

BACKGROUND

Seal assemblies are often used to form a seal between vehicle components. For example, a seal assembly may be used to form a seal between a vehicle door frame and a movable window closure member, such as a glass window pane. Typically, the vehicle door frame includes a flange having a contour with at least one curve and/or corner, and the seal assembly is coupled to and extends along the contour of the flange. In some instances, it may be difficult to suitably bend the seal assembly to conform to the contour of the flange at or along one or more curves or corners. The present disclosure is aimed at solving this issue.

SUMMARY

A seal assembly adapted to be coupled to a flange of a vehicle with the flange having a contour is disclosed. The seal assembly comprises at least one body portion having a base and first and second legs spaced from one another and extending from the base, with the base, the first leg, and the second leg defining a mounting channel for receiving the flange of the vehicle and the base defining an outer surface of the at least one body portion with the outer surface defining a first axis of curvature adapted to correspond with the contour of the flange of the vehicle, at least one sealing lip portion co-extruded with the at least one body portion with the sealing lip portion defining a notch having a notch configuration, an element disposed in the notch with the element having front and back surfaces and pre-formed to have an element configuration corresponding to at least a part of the notch configuration, and a molding material molded to the back surface of said element, secured to the at least one sealing lip portion within the notch, and extending across the notch, with the element and the molding material defining a contour lip portion that in combination with the at least one sealing lip portion defines an external sealing lip of the seal assembly.

Also disclosed is a method of manufacturing a seal assembly adapted to be coupled to a flange of a vehicle with the flange having a contour with said method utilizing a mold having a mold cavity. The method comprises the steps of: extruding at least one body portion having a base and first and second legs spaced from one another and extending from the base, with the base, the first leg, and the second leg defining a mounting channel for receiving the flange of the vehicle and the base defining an outer surface of the at least one body portion with the outer surface defining a first axis of curvature adapted to correspond with the contour of the flange of the vehicle; co-extruding at least one sealing lip portion with the at least one body portion to form a co-extruded product; cutting a notch in the at least one sealing lip portion of the co-extruded product with the notch having a notch configuration; forming an element having an element configuration and front and back surfaces with the element configuration corresponding to at least part of the notch configuration; securing the element inside the mold cavity of the mold; disposing the co-extruded product into the mold cavity such that the notch is positioned about the element; and injecting a molding material into the notch against the back surface of the element to secure the element in the notch such that the element and the molding material define a contour lip portion that in combination with the at least one sealing lip portion defines an external sealing lip of the seal assembly.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

FIG. 6 is a cross-sectional, perspective view of the co-extruded product taken along line 6-6 of FIG. 4.

FIG. 7 is a cross-sectional view of the co-extruded product taken along line 7-7 of FIG. 8.

FIG. 7A is an exploded view of a portion of the co-extruded product of FIG. 7.

FIG. 16 further illustrates positioning of the element and the co-extruded product of the first embodiment of the seal assembly within the mold cavity during a method of manufacturing the seal assembly.

FIG. 19 is a cross-sectional view of the mold with the element and the co-extruded product positioned within the mold cavity and a molding material filling a notch defined by a sealing lip portion of the co-extruded product.

DETAILED DESCRIPTION

Figure 1:
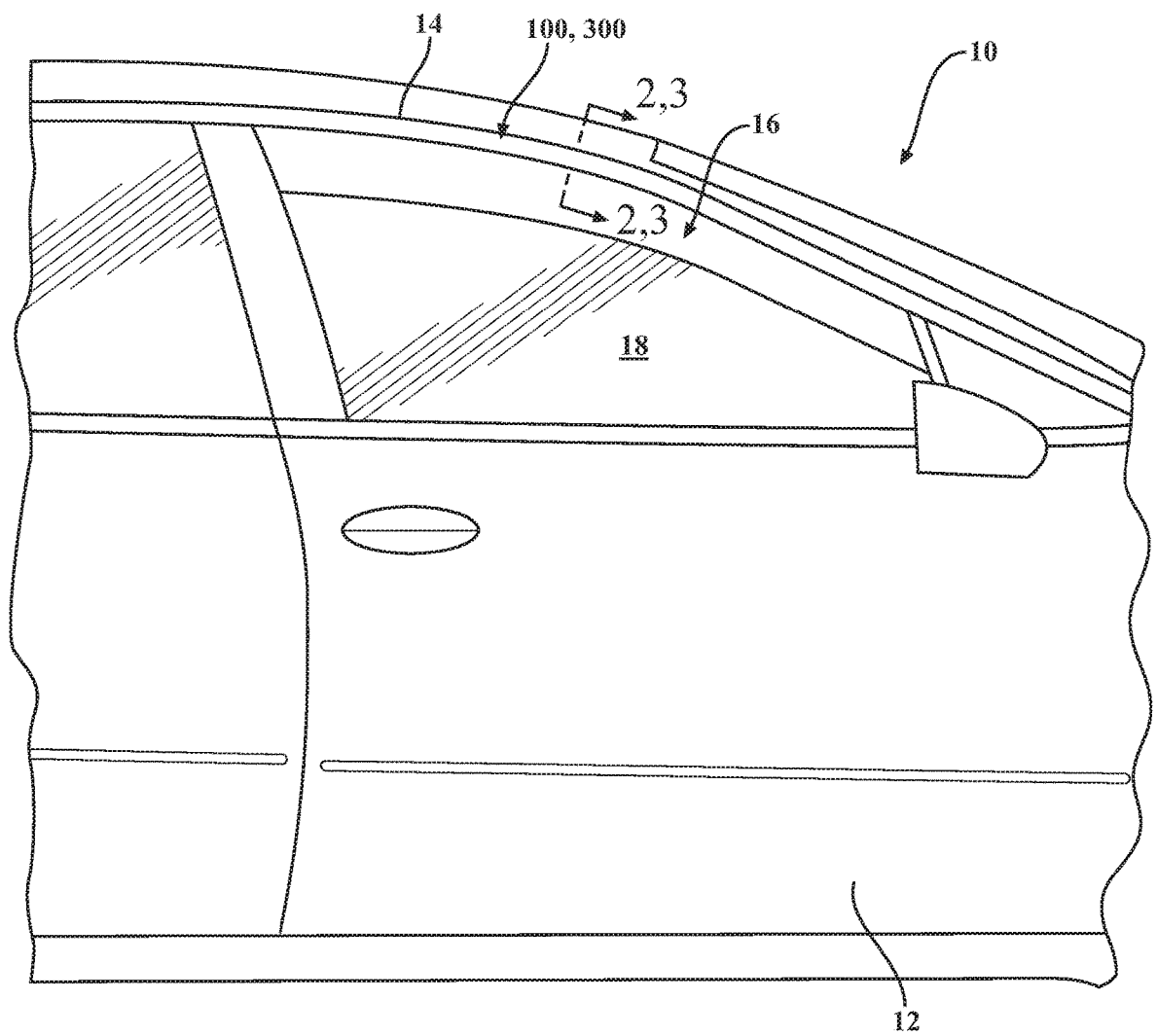
FIG. 1 is a side view of a portion of a vehicle including a passenger-side front door having a door frame and a seal assembly coupled to the door frame.

Referring now to the figures, wherein like numerals indicate corresponding parts throughout the several views, embodiments of a seal assembly 100, 300 are shown throughout the figures and are described in detail below. The seal assembly 100, 300 is configured for use in a vehicle 10, such as a passenger car, truck, or other transportation vehicle. The vehicle 10 includes a plurality of doors 12, such as the passenger-side door 12 shown in FIG. 1. The door 12 has a frame 14 (best shown in FIG. 2) defining at least one window 16. The door 12 further has a movable window closure member 18 (such as a glass window pane) movable between open and closed positions relative to the frame 14. The seal assembly 100, 300 is applied and/or coupled to the frame 14 of the door 12. Alternatively, the seal assembly 100, 300 could be applied and/or coupled to other frames 14 of the vehicle 10, such as any vehicle panel defining a window and having a movable or fixed window closure member.

Figure 2:
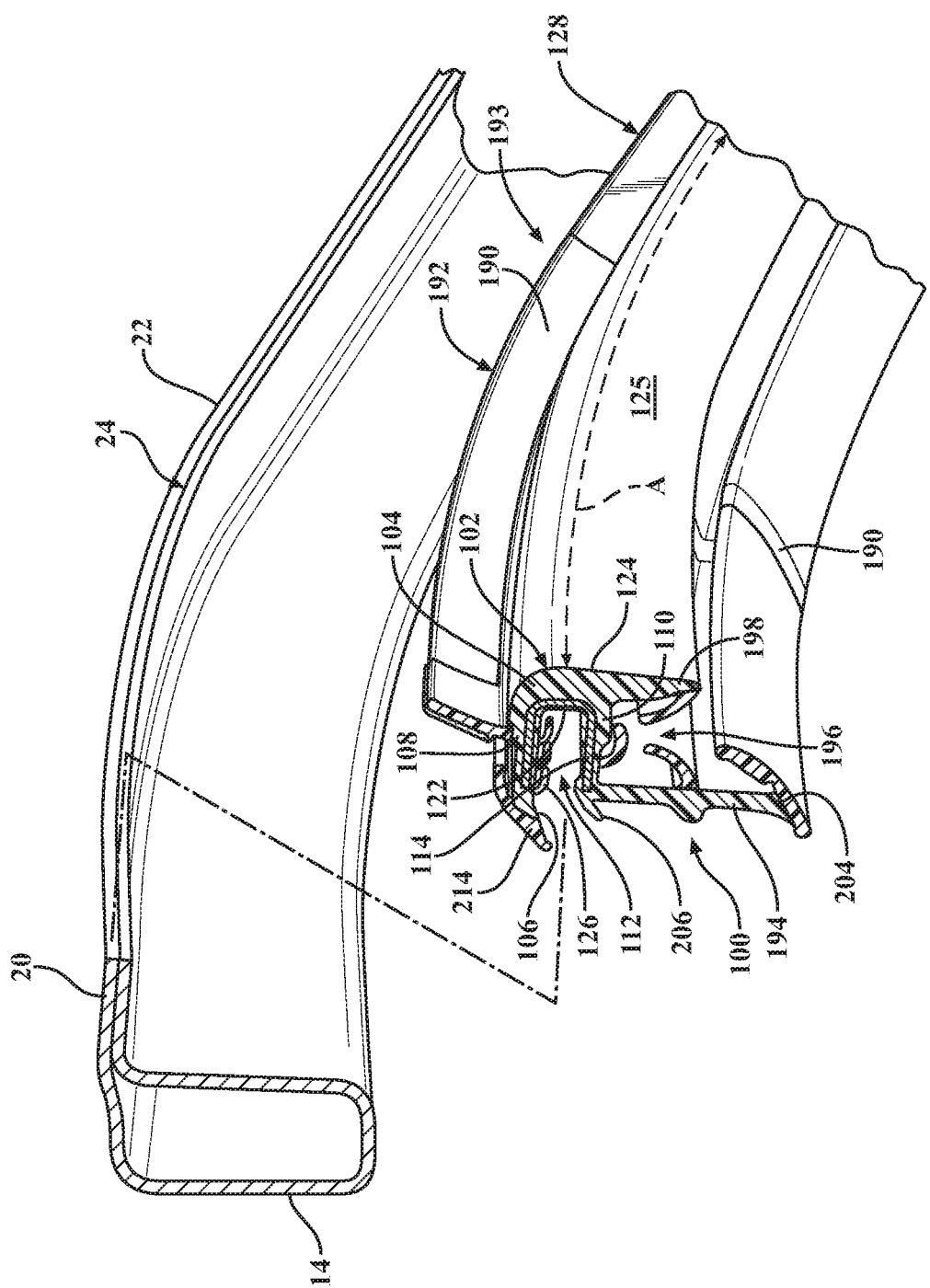
FIG. 2 is an exploded, cross-sectional, perspective view of a portion of the door frame and the seal assembly coupled to the door frame taken along line 2-2 in FIG. 1, according to a first embodiment of the present disclosure.

As shown in FIG. 2, the frame 14 of the vehicle 10 has a flange 20 having a contour 22. The contour 22 of the flange 20 has a curve, bend, and/or corner. As used herein, a curve or bend refers to a slight or moderate change in direction of the flange 20. A curve is shown at 24 in FIG. 2. As also used herein, a corner refers to a sharp, such as a 90 degree, change in the direction of the flange 20. Other than as described above, the flange 20 is shown generically and/or schematically in FIG. 2 and may have any suitable thickness, length, and/or configuration.

Figure 3:
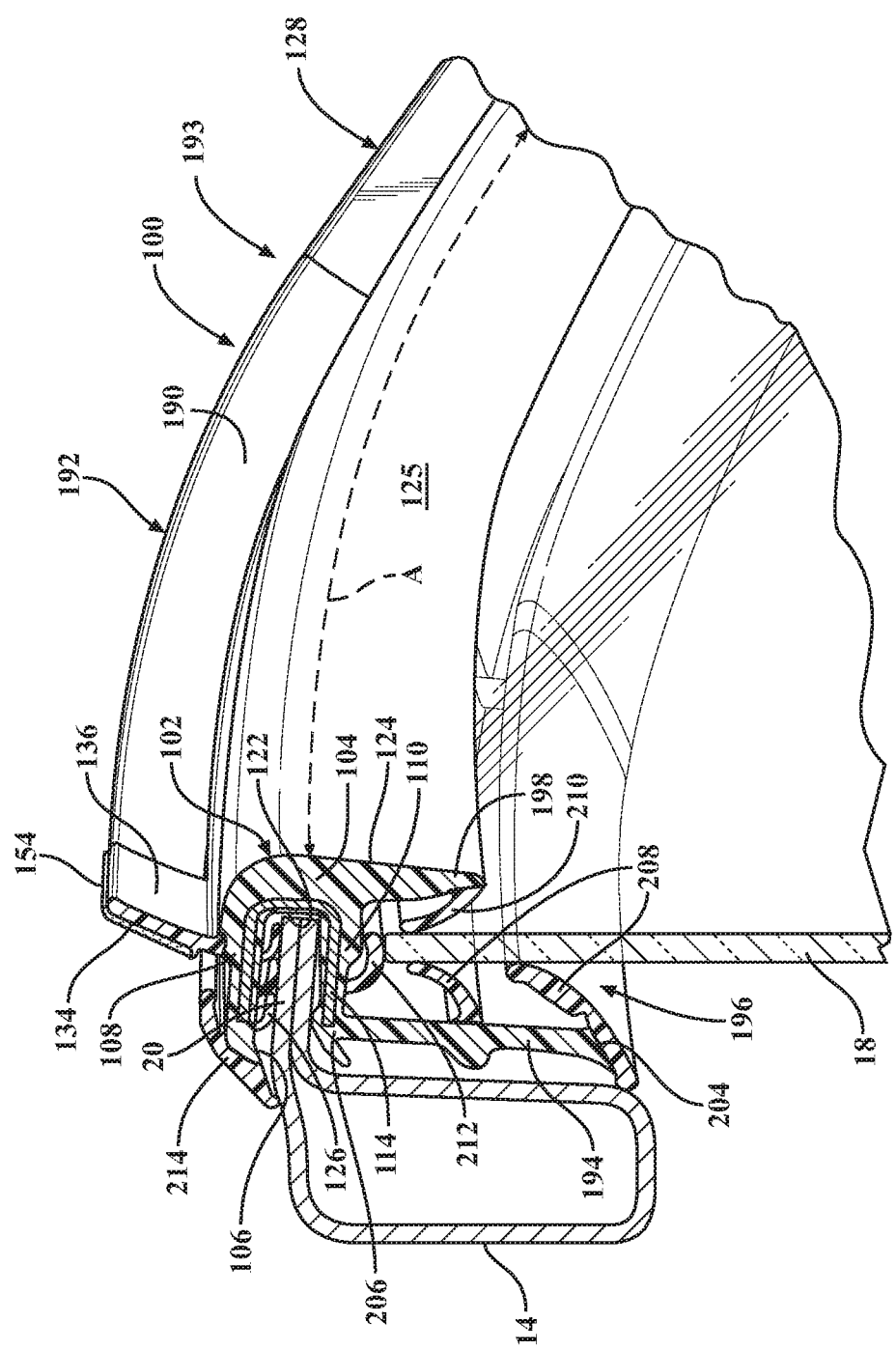
FIG. 3 is a cross-sectional, perspective view of a portion of the first embodiment of the seal assembly coupled to the flange of the vehicle door frame taken along line 3-3 of FIG. 1.

FIGS. 2 and 3 show a first embodiment of the seal assembly 100 adapted to be coupled to the flange 20 and extend at least partially along the contour 22 (having a curve, bend, and/or corner) of the flange 20. Details of the first embodiment of the seal assembly 100 are described below with reference to FIGS. 2-10. It is to be appreciated that the second embodiment of the seal assembly 300, described below in conjunction with FIGS. 11-15, is also adapted to be coupled to the flange 20 and extend at least partially along the contour 22 of the flange 20. In addition, it is noted that some features of the seal assembly 100, 300 are schematically and/or generically illustrated throughout the figures.

As shown in FIGS. 2-10, the first embodiment of the seal assembly 100 includes at least one body portion 102 defining a first axis of curvature A adapted to correspond with the contour 22 of the flange 20 of the vehicle 10. The first axis of curvature A is nonlinear when the seal assembly 100 is coupled to the vehicle 10, as the at least one body portion 102 bends or flexes to follow the contour 22 of the flange 20 of the vehicle 10. The at least one body portion 102 is formed, such as extruded, from a polymeric material enabling the at least one body portion 102 to bend or flex to follow the contour 22 of the flange 20 of the vehicle 10. In an embodiment, the polymeric material of the at least one body portion 102 is selected from at least one thermoplastic material, at least one thermoset material, and combinations thereof. In another embodiment, the polymeric material is further defined as a thermoplastic vulcanizate (TPV). In another embodiment, the polymeric material is further defined as an ethylene propylene diene monomer (EPDM) rubber, such as an extrusion-grade EPDM rubber. In yet another embodiment, the polymeric material is further defined as a combination of TPV and an EPDM rubber. It is to be appreciated that the at least one body portion 102 may be formed from any suitable polymeric material or combination of polymeric materials not specifically mentioned herein, and the at least one body portion 102 may have any suitable hardness, rigidity, density, etc.

In the first embodiment, the at least one body portion 102 is further defined as a single body portion having a body length BL. The at least one body portion 102 further has a closed end 104 and an open end 106 opposite the closed end 104, with both the closed 104 and open 106 ends extending along the body length BL. The closed end 104 is further defined as a base 104 of the at least one body portion 102. The at least one body portion 102 further has first 108 and second 110 legs spaced from one another and extending from the base 104. The first 108 and second 110 legs may extend substantially parallel to one another, or one leg 108, 110 may be slightly angularly offset from the other leg 108, 110 such that the first 108 and second 110 legs deviate from being parallel. In addition, the first 108 and second 110 legs are transverse to the base 104. The base 104, the first leg 108, and the second leg 110 define a mounting channel 112 for receiving the flange 20 of the vehicle 10 for securing and/or gripping the seal assembly 100 to the frame 14. In the illustrated embodiment, the mounting channel 112 is substantially 'U' shaped and extends along the first axis of curvature A. Notably, the shape of the mounting channel 112 is shown generically and/or schematically, and the 'U' shape of the mounting channel 112 may not necessarily be a perfectly shaped 'U'. Alternatively, the mounting channel 112 could have any suitable shape and/or configuration.

The at least one body portion 102 further has inner 122 and outer 124 surfaces. The inner surface 122 is defined by the base 104, the first leg 108, and the second leg 110 of the at least one body portion 102, and the inner surface 122 defines the mounting channel 112. Additionally, the base 104 at least partially defines an exposed surface 125 of the seal assembly 100. The outer surface 124 further defines the first axis of curvature A adapted to correspond with the contour 22 of the flange 20 of the vehicle 10.

In an embodiment, the seal assembly 100 further includes a carrier 114, such as a metal carrier or other reinforcing member, disposed within the at least one body portion 102 for reinforcing the mounting channel 112. In one configuration, the carrier 114 is embedded in the at least one body portion 102 and extends along the body length BL of the at least one body portion 102. As shown at least in FIG. 5, the carrier 114 may have a base segment 116 disposed in the base 104 of the at least one body portion 102, and may further have first 118 and second 120 leg segments disposed within the first 108 and second 110 legs of the at least one body portion 102, respectively. In a non-limiting example, the carrier 114 is formed from an iron alloy such as steel. Non-limiting examples of steel include carbon steel, stainless steel, tool steel, coated steel, electro-galvanized steel, and mild steel. In another non-limiting example, the carrier 114 is formed from an aluminum alloy. It is to be appreciated that the carrier 114 can be formed from any suitable metal or other material not specifically mentioned above which is/are capable of providing suitable rigidity to enable the seal assembly 100 to grasp the flange 20 of the vehicle 10 for coupling the seal assembly 100 to the flange 20.

As shown in FIGS. 2, 3, 5-7, and 7A, the seal assembly 100 further includes a plurality of gripping fins 126 co-extruded with the at least one body portion 102. The gripping fins 126 extend from the first leg 108 of the at least one body portion 102 inwardly toward to the mounting channel 112. In an embodiment, all of the gripping fins 118 extend inwardly and are positioned inside the mounting channel 112. The gripping fins 126 may have any suitable configuration and may be formed from any suitable polymeric material. In an embodiment, the polymeric material of the gripping fins 126 is different from (such as more flexible than) the polymeric material of the at least one body portion 102. Such a material enables the gripping fins 126 to flex and grip the flange 20 received within the mounting channel 112. Alternatively, the gripping fins 126 may be formed from the same polymeric material as the at least one body portion 102.

The seal assembly 100 further includes at least one sealing lip portion 128 co-extruded with the at least one body portion 102. In the first embodiment, the at least one sealing lip portion 128 is further defined as a single sealing lip portion 128 that extends along the body length BL of the at least one body portion 102. As shown, the at least one sealing lip portion 128 extends from and is transverse to the first leg 108 of the at least one body portion 102 and is configured to form a seal against the door 12 of the vehicle 10. Additionally, the at least one sealing lip portion 128 may be formed from any suitable polymeric material, which may be different or the same as the polymeric material of the at least one body portion 102. In an example, the at least one sealing lip portion 128 is formed from a polymeric material that is different from (such as more flexible than) the polymeric material of the at least one body portion 102 to enable the at least one sealing lip portion 128 to flex to form a seal against the door 12. In a non-limiting example, the at least one sealing lip portion 128 is formed from a TPV, such as a TPV formed from or including polypropylene, polyethylene, ethylene vinyl acetate (EVA), and combinations thereof. In another non-limiting example, the at least one sealing lip portion 128 is formed from a combination of TPV and EPDM rubber. It should be appreciated that the at least one sealing lip portion 128 can be formed from other polymeric material(s) that is/are not specifically mentioned herein.

Figure 4:
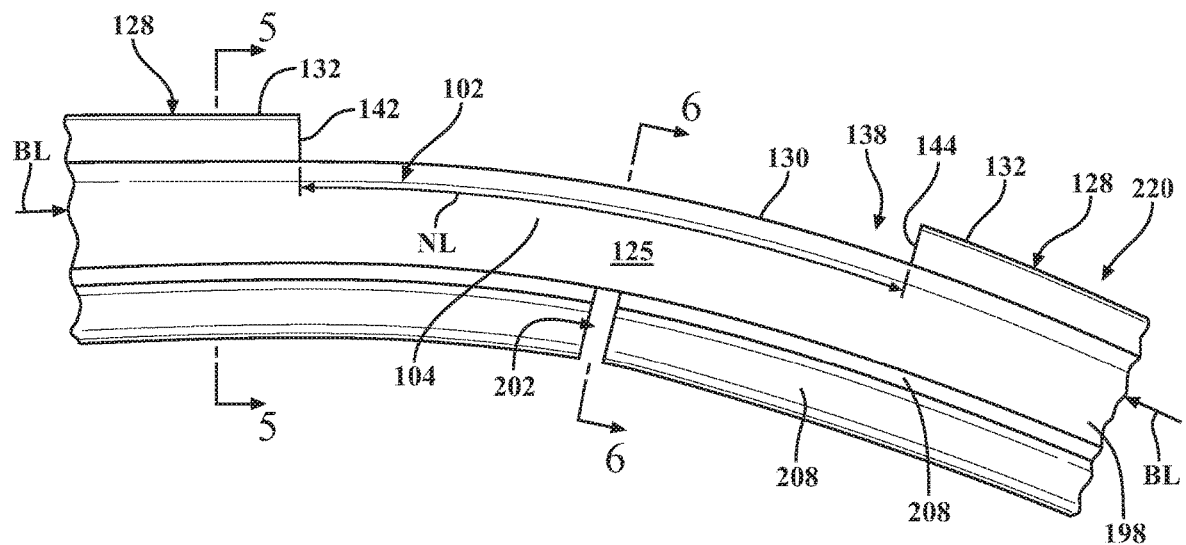
FIG. 4 is a front view of a co-extruded product of a portion of the first embodiment of the seal assembly of FIG. 2.
Figure 5:
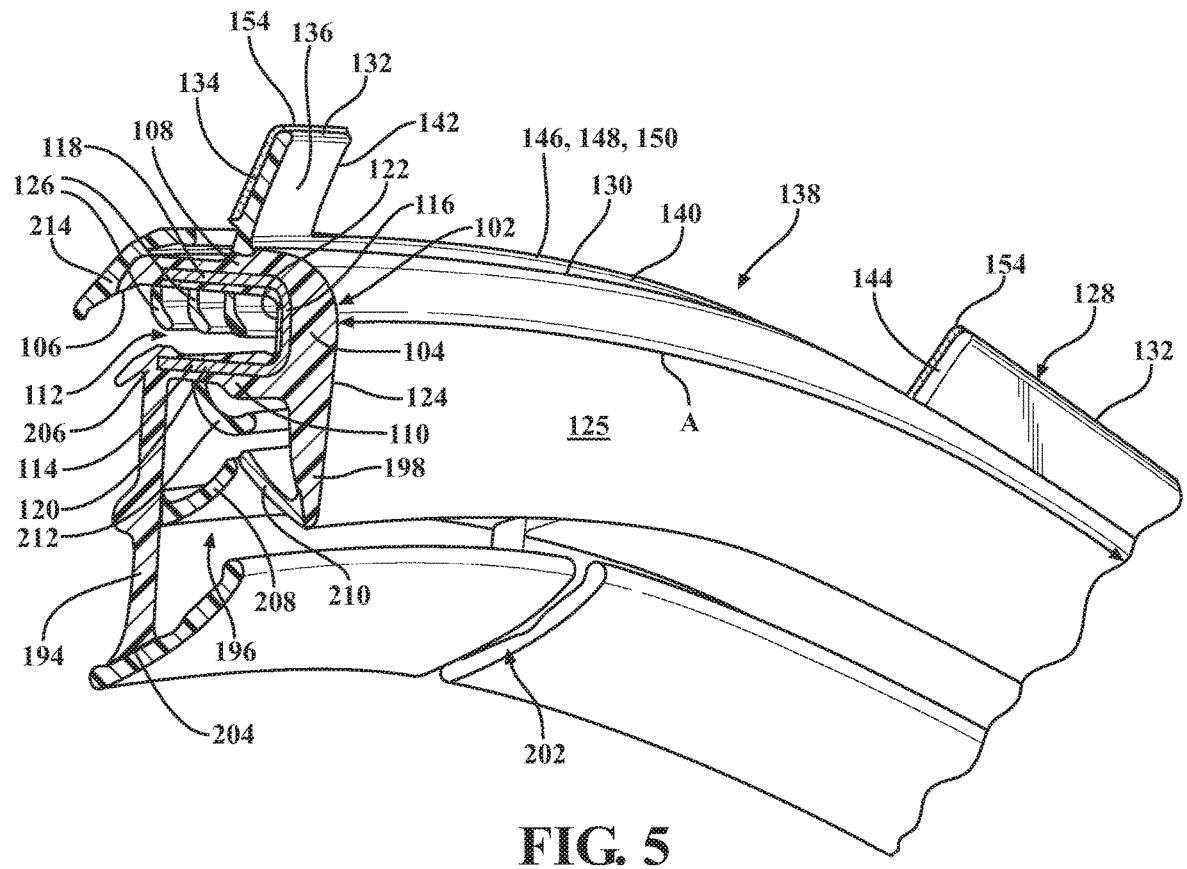
FIG. 5 is a cross-sectional, perspective view of the co-extruded product taken along line 5-5 of FIG. 4.

The at least one sealing lip portion 128 has inner 130 and outer 132 edges with the inner edge 130 attached to the at least one body portion 102. As best illustrated in FIGS. 3, 5, and 6, the at least one sealing lip portion 128 further has front 134 and back 136 surfaces extending between the inner 130 and outer 132 edges. The at least one sealing lip portion 128 defines a notch 138 having a notch configuration. As shown in FIG. 4, the notch 138 has a notch length NL extending at least along a portion of the body length BL of the at least one body portion 102 that curves or bends. The curving or bending of the at least one body portion 102 corresponds to the curving or bending of the flange 20 of the vehicle frame 14. As shown in FIGS. 5 and 6, for example, the notch 138 is formed through the outer edge 132 and extends toward but terminates prior to the inner edge 130 to define a bonding region 140 of the at least one sealing lip portion 128. The bonding region 140 is directly attached to the first leg 108 of the at least one body portion 102 and may have any suitable width and/or configuration.

Figure 8:
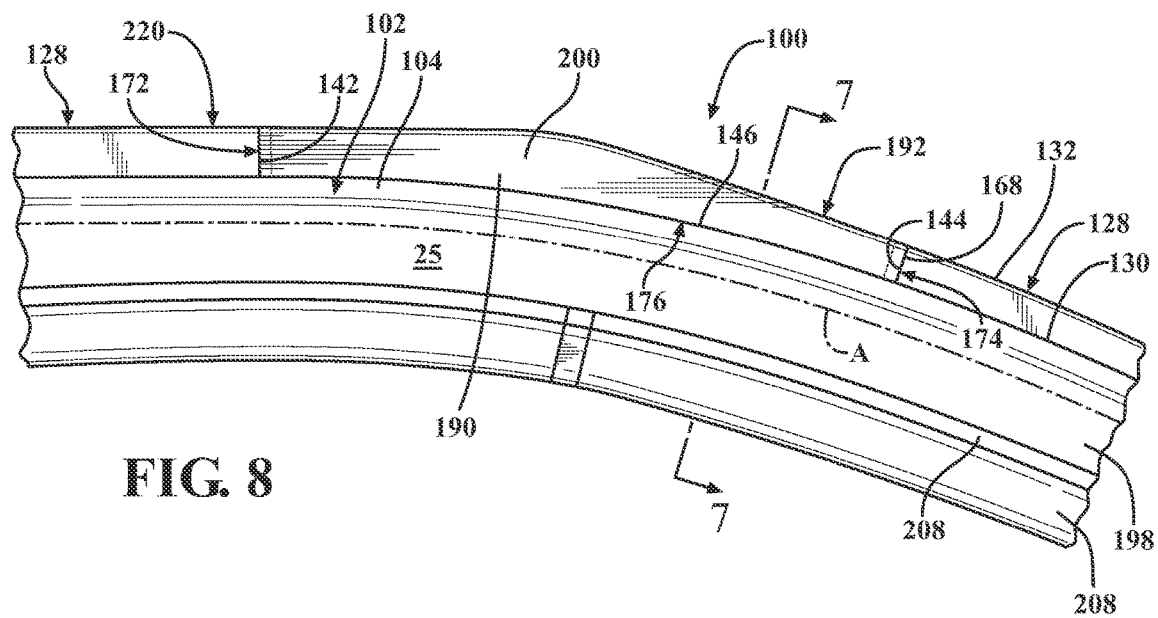
FIG. 8 is a front view of a portion of the first embodiment of the seal assembly.

The at least one sealing lip portion 128 further has first 142 and second 144 interior edges partially defining the notch 138. The at least one sealing lip portion 128 further has a third interior edge 146 defining a top surface 148 of the bonding region 140. The top surface 148 defines a bottom 150 of the notch 138. The first 142, second 144, and third 146 interior edges of the at least one sealing lip portion 128 may have any desirable shape and/or configuration. In an embodiment, the at least one sealing lip portion 128 may be notched at the first 142 and second 144 interior edges. This is shown in FIG. 8. The molding material 190 would fill the notched region of the at least one sealing lip portion 128 at each of the interior edges 142, 144 when securing an element 156 within the notch 138. In another embodiment, the first 142 and second 144 interior edges are not notched and have a flat configuration. The third interior edge 146 has a curved configuration, which may be aligned with the first axis of curvature A. In an alternative embodiment, the curved configuration of the third interior edge 146 could be angularly offset from the first axis of curvature A.

Figure 9:
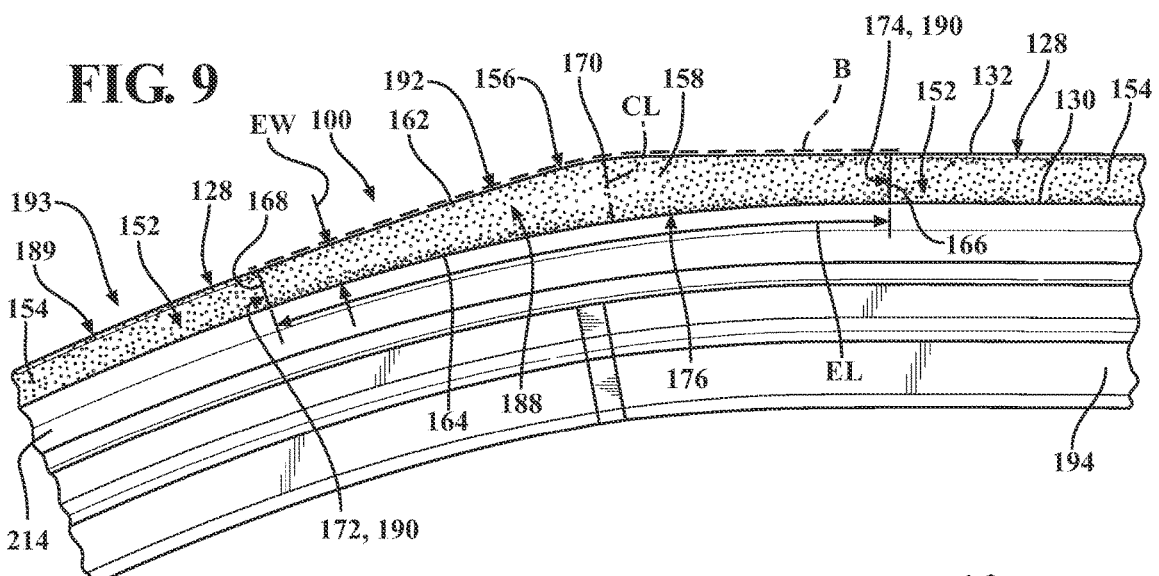
FIG. 9 is a rear view of a portion of the first embodiment of the seal assembly.

The seal assembly 100 further has an anti-friction coating 154 deposited on the front surface 134 of the at least one sealing lip portion 128 to form a coated lip surface 152, as best shown in FIG. 9. The anti-friction coating 154 may be a coating, layer, or covering of particles deposited, disposed, or directly applied on the front surface 134 of the at least one sealing lip portion 128 and is useful to reduce friction with the door 12 of the vehicle 10. In an embodiment, the anti-friction coating 154 is a flocking material (or flock) deposited, disposed, or directly applied to the front surface 134 of the at last one sealing lip portion 128. In a non-limiting example, the flocking material is a flocking spray or flocking powder directly applied to the front surface 134 of the at least one sealing lip portion 128. In another non-limiting example, the anti-friction coating 154 may be formed by depositing the flocking material on one side of a substrate and applying an adhesive to an opposing side of the substrate to form a flocking tape. The adhesive side of the flocking tape may be directly applied to the front surface 134 of the at least one sealing lip portion 128. Typically, the anti-friction coating 154 has a substantially uniform thickness and may be applied across the substantially the entire front surface 134 of the at least one sealing lip portion 128. In the illustrated embodiment, the anti-friction coating 154 is applied to the entire front surface 134 of the at least one sealing lip portion 128 except for at the first 142, second 144, and third 143 interior edges of the at least one sealing lip portion 128 and the bonding region 140. While the anti-friction coating 154 is useful for reducing friction with the door 12 of the vehicle, the anti-friction coating 154 may also be useful for water absorption, vibration dampening, and thermal insulation.

The seal assembly 100 further includes the element 156 disposed in the notch 138. As described in detail below in connection with a method of manufacturing the seal assembly 100, the element 156 is pre-formed, and the pre-formed element 156 is disposed within the notch 138 and molded to the at least one sealing lip portion 128.

With reference to FIGS. 7-10, the element 156 has front 158 and back 160 surfaces and is pre-formed to have an element configuration corresponding to at least part of the notch configuration. The element 156 further has an outer edge 162 and an inner edge 164 spaced from the outer edge 162. The outer edge 162 defines a second axis of curvature B (shown in FIG. 9), and the inner edge 164 defines a third axis of curvature C. When the element 156 is secured within the notch 138, the second axis of curvature B is angularly offset from the first axis of curvature A. Additionally, the third axis of curvature C is aligned with the first axis of curvature A and is angularly offset from the second axis of curvature B.

The element 156 further has first 166 and second 168 side edges. An apex 170 is formed along a center line CL of the element 156 extending between the outer 162 and inner 164 edges and measured at the center between the first 166 and second 168 side edges. Alternatively, the apex 170 could be offset from the center line CL of the element 156, such as located closer to the first side edge 166 or located closer to the second side edge 168.

The element 156 further has an element length EL (measured between the first 166 and second 168 side edges). The element length EL is substantially the same as the notch length NL. The element 156 further has an element width EW (measured between the outer 162 and inner 164 edges), with the element width EW varying across the element length EL. For example, the element width EW may be the largest at the apex 170 and may gradually decrease in one direction along the element length EL from the apex 170 toward the first side edge 166 and decrease in the other direction along the element length EL from the apex 170 toward the second side edge 168. In an alternative embodiment, the element 156 could be formed without an apex 170. In this embodiment, the second axis of curvature B defined by the outer edge 162 would be aligned with the first axis of curvature A defined by the outer surface 124 of the at least one body portion 102. The second axis of curvature B would also be aligned with the third axis of curvature C defined by the inner edge 164 of the element 156.

In the illustrated embodiment, the element configuration corresponds to the entire notch configuration. With this configuration, the first side edge 166 of the element 156 is adjacent the first interior edge 142 of the at least one sealing lip portion 128 to define a first interface 172. The second side edge 168 of the element 156 is adjacent the second interior edge 144 of the at least one sealing lip portion 128 to define a second interface 174. As previously mentioned, the at least one sealing lip portion 128 may be notched. Therefore, the first 172 and second 174 interfaces could have staggered configuration. Additionally, the element 156 has the inner 164 and outer 162 edges with the inner edge 164 of the element 156 adjacent the third interior edge 146 of the at least one sealing lip portion 128 to define a third interface 176.

Figure 9A:
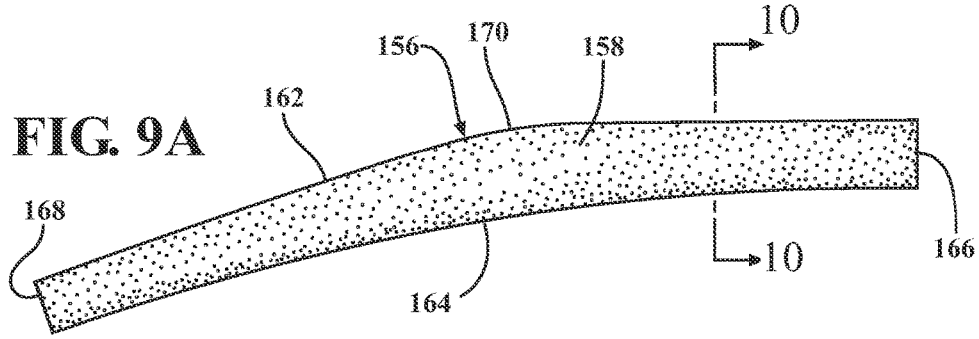
FIG. 9A is a front side view of an element of the first embodiment of the seal assembly.
Figure 10:
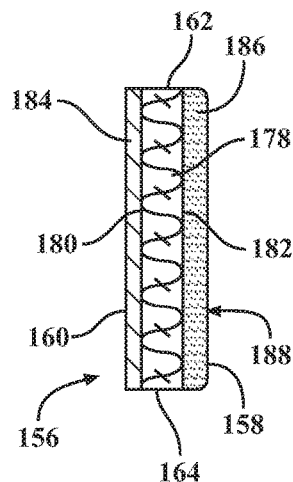
FIG. 10 is a schematic, cross-sectional view of the element of the first embodiment of the seal assembly taken along line 10-10 of FIG. 9A.
Figure 11:
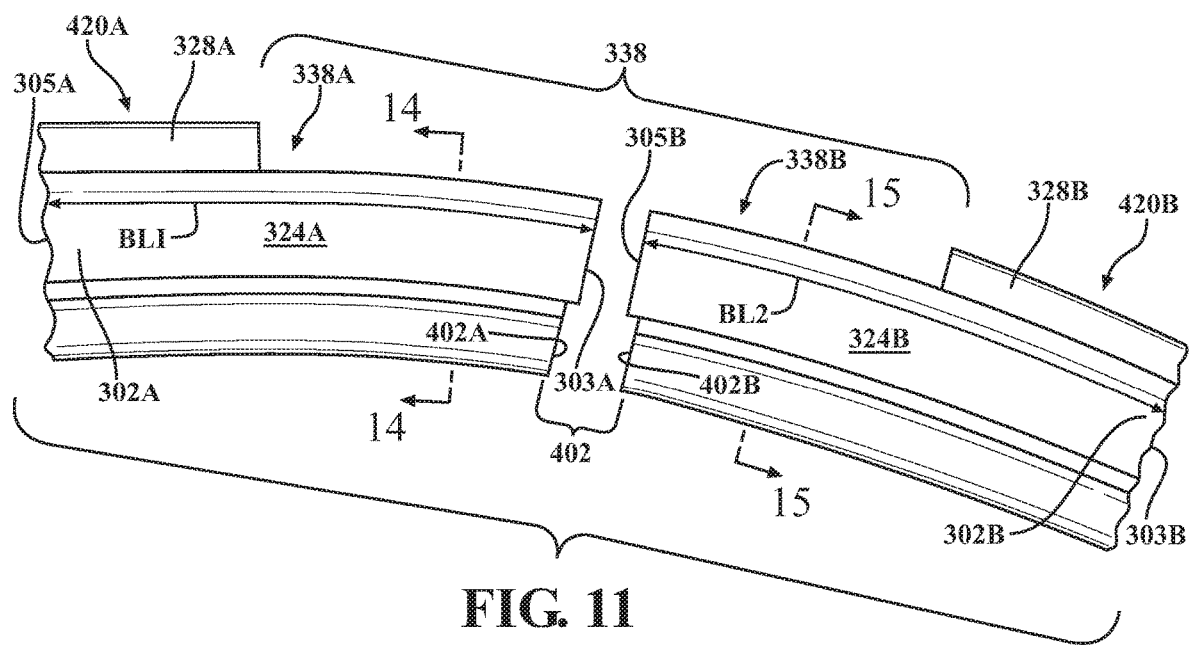
FIG. 11 is an exploded view of first and second co-extruded products of a seal assembly according to a second embodiment of the present disclosure.
Figure 12:
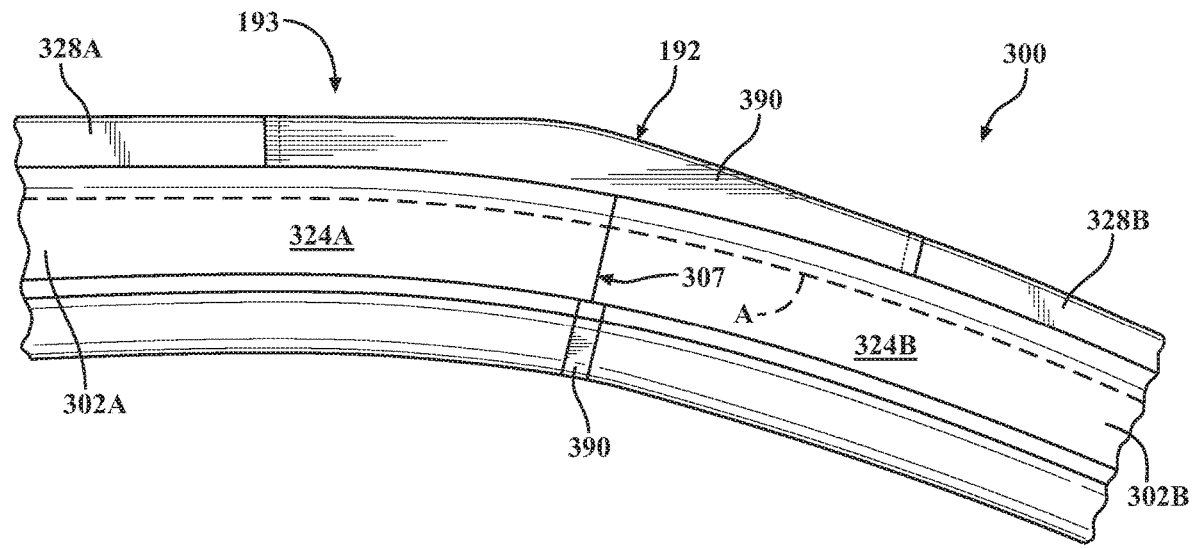
FIG. 12 is a front view of a portion of the second embodiment of the seal assembly.
Figure 13:
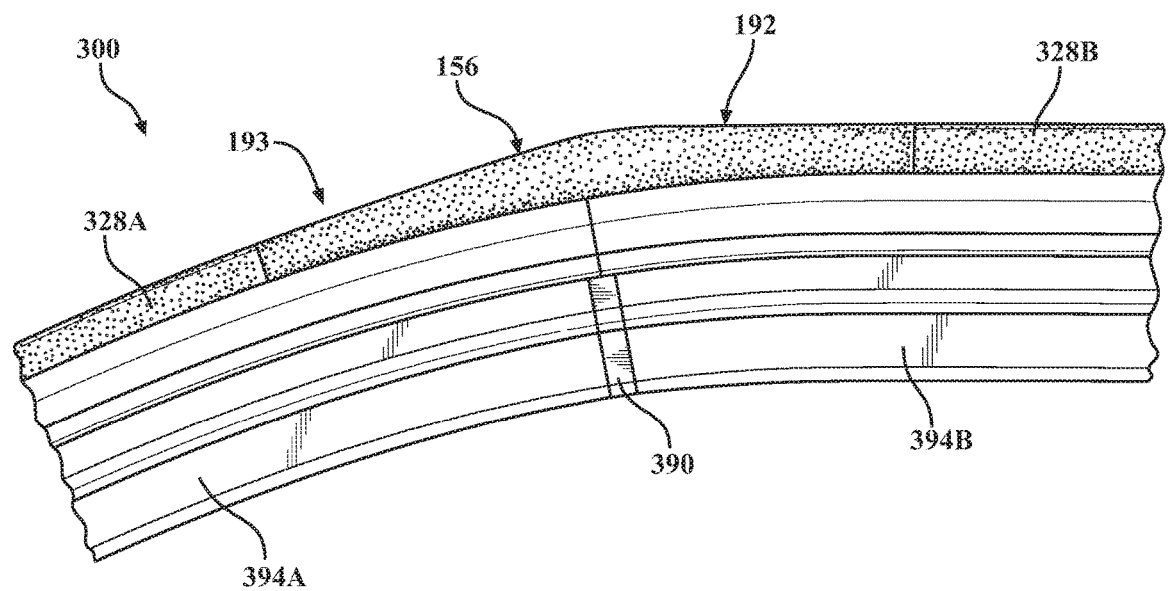
FIG. 13 is a rear view of a portion of the second embodiment of the seal assembly.
Figure 14:
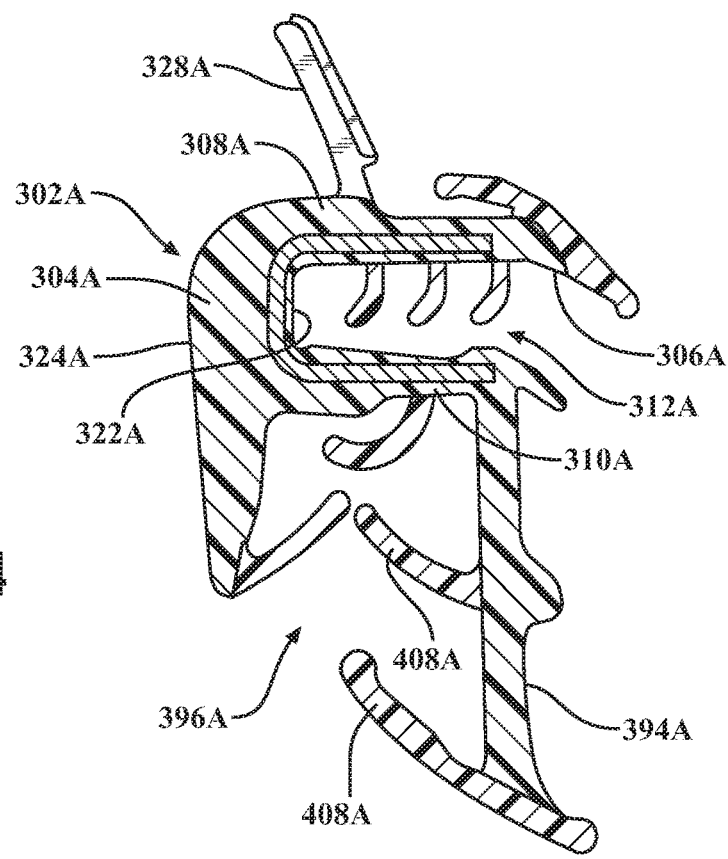
FIG. 14 is a cross-sectional view of the first co-extruded product of the seal assembly taken along line 14-14 of FIG. 11.
Figure 15:
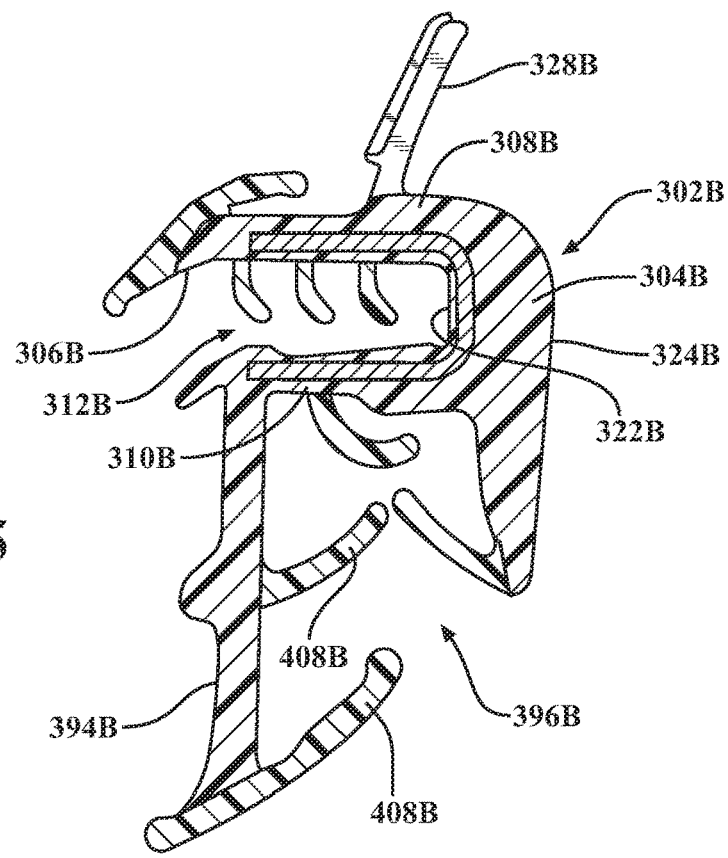
FIG. 15 is a cross-sectional view of a second co-extruded product of the seal assembly taken along line 15-15 of FIG. 11.

Further details of the element 156 are described below with reference to FIGS. 9A and 10. The element 156 includes a substrate 178 having opposing surfaces 180, 182. The substrate 178 can be formed from any suitable material. In a non-limiting example, the substrate 178 is a fabric. The element 156 further has an adhesive 184 applied on one of the surfaces 180 and an anti-friction coating 186 directly applied, disposed, or deposited on another one of the surfaces 182 to define a coated element surface 188. It is to be appreciated that the thicknesses of the substrate 178, the adhesive 184, and the anti-friction coating 186 are exaggerated in FIG. 10, and in other figures, for purposes of illustration. Additionally, while the adhesive 184 is shown in FIG. 10 as a layer, it is possible that the adhesive 184 may be part of or integral with the substrate 178 such that no physical layer of adhesive exists.

The anti-friction coating 186 may have a substantially uniform thickness. Alternatively, the thickness of the anti-friction coating 186 could vary across the surface 182 of the element 156. The anti-friction coating 186 may be a coating, layer, or covering of particles directly applied, disposed, or deposited across substantially the entire surface 182 of the substrate 178 and is useful to reduce friction with the door 12 of the vehicle 10. In an embodiment, the anti-friction coating 186 is a flocking material (or flock) deposited, disposed, or directly applied to the surface 182 of the substrate 178. In a non-limiting example, the flocking material is a flocking spray or flocking powder directly applied to the surface 182 of the substrate 178. In a non-limiting example, the element 156 is a piece of TaplaTape® Flock available from Tapla Industries (Spain). The TaplaTape® Flock includes the substrate 178 having a water-based, heat-activated adhesive 184 directly applied or disposed on the surface 180 of the substrate 178 and an anti-friction coating 186 (flocking material) deposited, disposed, or directly applied on the opposing surface 182 of the substrate 178.

The seal assembly 100 further includes the molding material 190 molded to the back surface 160 of the element 156 (disposed within the notch 138), secured to the at least one sealing lip portion 128 within the notch 138, and extending across the notch 138. The element 156 and the molding material 190 define the contour lip portion 192 that in combination with the at least one sealing lip portion 128 defines an external sealing lip 193 of the seal assembly 100. The molding material 190 may be any suitable polymeric material. In an embodiment, the molding material 190 is further defined as an elastomer. In another embodiment, the molding material 190 is further defined as a TPV. In yet another embodiment, the molding material is selected from TPV, a styrene-based thermoplastic elastomer (such as styrene butadiene thermoplastic elastomer), and combinations thereof. Details of the molding of the molding material 190 within the notch 138 is described below with reference to a method of manufacturing the seal assembly 100.

Additionally, the coated lip surface 152 of the at least one sealing lip portion 128 and the coated element surface 188 of the element 156 collectively form a coated front surface 189 of the external sealing lip 193 of the seal assembly 100. As shown, the anti-friction coating material extends across the entire coated front surface 189 of the external seal lip 193 except at the first interface 172 (formed between the first side edge 166 of element 156 and the first interior edge 142 of the at least one sealing lip portion 128), the second interface (formed between the second side edge 168 of the element 156 and the second interior edge 144 of the at least one sealing lip portion 128), and the third interface (formed between inner edge 164 of the element 156 and the third interior edge 146 of the at least one sealing lip portion 128). In other words, the anti-friction coating material is discontinuous across the coated front surface 189 of the external sealing lip 193, with a small section of the sealing lip portion 128 without the anti-friction material at each of the interfaces 172, 174, 176. In an alternative embodiment, the anti-friction coating material is present at the interfaces 172, 174, and 176, and is continuous across the coated front surface 189. After molding, the molding material 190 is located at the first interface 172 to join the first side edge 166 of the element 156 and the first interior edge 142 of the at least one sealing lip portion 128. The molding material 190 is located at the second interface 174 to join the second side edge 168 of the element 156 and the second interior edge 144 of the at least one sealing lip portion 128. Further, the molding material 190 is located at the third interface 176 to join the inner edge 164 of the element 156 and the third interior edge 146 of the at least one sealing lip portion 128. This way, the molding material 190 is secured to the at least one sealing lip portion 128 within the notch 138.

Additionally, and as previously mentioned, the molding material 190 is molded to the back surface 160 of the element 156 and extends across the notch 138. In the embodiment where the edges 142, 144 of the sealing lip portion 128 are notched, the molding material 190 extends into the notched regions of the first 142 and second 144 interior edges. In another embodiment, the molding material 190 extends and is continuous across the entire back surface 160 of the element 156 to form a back surface 200 of the contour lip portion 192 of the seal assembly 100. With the molding material 190 molded to the at least one sealing lip portion 128 at the first 172 and second 174 interfaces, the back surface 200 of the contour lip portion 192 merges or joins with the back surface 136 of the at least one sealing lip portion 128 to form a continuous, relatively flush, exposed back surface of the external sealing lip 193 of the seal assembly 100.

The seal assembly 100 further includes a sealing flange 194 co-extruded with the at least one body portion 102 with the sealing flange 194 extending transverse to the second leg 110 and the sealing flange 194 spaced from the base 104 to partially define a window channel 196 for receiving the movable window closure member 18 of the vehicle 10. In an embodiment, the sealing flange 194 is further defined as an inner sealing flange 194 and the seal assembly 100 further has an outer sealing flange 198 aligned with the base 104 and extending beyond the second leg 110 of the at least one body portion 102. The outer sealing flange 198 may be co-extruded with the at least one body portion 102. In the embodiment shown, the outer sealing flange 198 is integral with the base 104 such that the outer sealing flange 198 and the base 104 collectively form the exposed surface 125 of the seal assembly 100 having a smooth and/or aesthetically pleasing appearance. Additionally, the second leg 110, the inner sealing flange 194, and the outer sealing flange 198 collectively define the window channel 196 for receiving the movable window closure member 18 of the vehicle 10.

The inner 194 and outer 198 sealing flanges may extend substantially parallel to one another, or one of the sealing flanges 194, 198 may be slightly angularly offset from the other sealing flange 194, 198 such that the inner 194 and outer 198 sealing flanges deviate from being parallel. In addition, the inner 194 and outer 198 sealing flanges are transverse to the second leg 110 of the at least one body portion 102. As previously mentioned, the inner sealing flange 194, the second leg 110 of the at least one body portion 102, and the outer sealing flange 198 define the window channel 196 for receiving the window closure member 18 of the vehicle 10. In the illustrated embodiment, the window channel 196 is substantially 'U' shaped and extends along the first axis of curvature A. Notably, the shape of the window channel 196 is shown generically and/or schematically, and the 'U' shape of the window channel 196 may not necessarily be a perfectly shaped 'U'. Alternatively, the window channel 196 could have any suitable shape and/or configuration.

The (inner) sealing flange 194 at least partially defines a gap 202 that in combination with the notch 138 allows curvature of the seal assembly 100 along the first axis of curvature A. For example, prior to molding, the co-extruded product 220, including the at least one body portion 102, the at least one sealing lip portion 128, and the sealing flange 194, is bent in selected areas so that the co-extruded product 220 follows the curvature of the contour 22 of the vehicle flange 20. The presence of the notch 138 and the gap 202, in combination, allows or permits the co-extruded product 220 to be bent in the selected areas so that the seal assembly 100 can be formed to follow the curvature or contour 22 of the vehicle flange 20. The gap 202 may have any desirable size, shape, and/or configuration. The sealing flange 194 has outer 204 and inner 206 edges and the gap 202 is formed through the outer edge 204 and extends inwardly toward the inner edge 206. In an embodiment, the gap 202 is formed through the outer edge 204 and extends inwardly to the inner edge 206. In an alternative embodiment, the gap 202 can be formed through the outer edge 204 and extend inwardly toward but terminate prior to the inner edge 206 of the sealing flange 194.

In the embodiment shown, the seal assembly 100 further has at least one sealing finger 208 extending from the sealing flange 194 inwardly toward the window channel 196. In the illustrated embodiment, the seal assembly 100 has a plurality of sealing fingers 208 (for example, two sealing fingers 208 which are spaced from one another as shown in FIGS. 2, 3, and 5-7) extending from the inner sealing flange 194 inwardly toward the window channel 196. It is to be appreciated that the seal assembly 100 could have any number of sealing fingers 208 extending from the sealing flange 194 inwardly toward the window channel 196.

As shown, the at least one sealing finger 208 further defines the gap 202. For example, and in this embodiment, the gap 202 is defined by the sealing flange 194 and the at least one sealing finger 208. As will be described in further detail below, the co-extruded product 220 (which includes at least that at least one body portion 102, the at least one sealing lip portion 128, and the sealing flange 194) is placed within a mold with a bend at an angle corresponding to a curve, bend, or corner of the contour 22 of the vehicle flange 20. The combination of the notch 138 and the gap 202 allows for bending of the co-extruded product 220 at the desired angle corresponding to the contour 22 of the flange 20. The molding material 190 is molded to the sealing flange 194 to fill the gap 202 and maintain the seal assembly 100 with the curvature along the first axis of curvature A. In embodiments where the seal assembly 100 further includes the sealing fingers 208, the molding material 190 is molded to the sealing flange 194 and the sealing fingers 208 to fill the gap 202 and maintain the seal assembly 100 with the curvature along the first axis of curvature A.

In an embodiment, the seal assembly 100 has at least one sealing finger 210 extending from the outer sealing flange 198 inwardly toward the window channel 196. The seal assembly further has at least one sealing finger 212 extending from the second leg 110 of the at least one body portion 102 inwardly toward the window channel 196. Additionally, the sealing fingers 208, 210, 212 extend toward one another. The sealing fingers 208, 210, 212 are formed from any suitable polymeric material. In an embodiment, the sealing fingers 208, 210, 212 are formed from a different polymeric material than the at least one body portion 102, such as a more flexible polymeric material enabling the sealing fingers 208, 210, 212 to flex or more to allow the movable window closure member 18 to be received in the window channel 196. In an embodiment, one or more of the sealing fingers 208, 210, 212 is formed from a TPV, such as a TPV formed from or including polypropylene, polyethylene, ethylene vinyl acetate (EVA), and combinations thereof. In another embodiment, one or more of the sealing fingers 208, 210, 212 is formed from a combination of TPV and EPDM rubber. It should be appreciated that the sealing fingers 208, 210, 212 can be formed form other polymeric material(s) that is/are not specifically mentioned herein. The sealing fingers 208, 201, 212 are also biased toward the window channel 196 so that the sealing fingers 208, 210, 212 form a seal between the movable window closure member 18 and the door frame 14 when the movable window closure member 18 is received within the window channel 196.

The seal assembly 100 further has an internal sealing lip 214 extending from the first leg 108 of the at least one body portion 102 and along the body length BL of the at least one body portion 102. The internal sealing slip 214 is spaced from the external sealing lip 193 with the sealing lips 193, 214, alone or in combination, forming a seal against the vehicle door 12. The internal sealing lip 214 may be formed from a flexible polymeric material, which may be the same or different polymeric material(s) as the at least one sealing lip portion 128.

The second embodiment of the seal assembly 300 is described below with reference to FIGS. 11-15. The second embodiment of the seal assembly 300 is the same as the first embodiment of the seal assembly 100 except that the at least one body portion is further defined as first 302A and second 302B body portions. The first body portion 302A has a closed end 304A and an open end 306A opposite the closed end 304A, with both the closed 304A and open 306A ends extending along a first body length BL1. The closed end 304A is further defined as the base 304A of the first body portion 302A. The first body portion 302A further has first 308A and second 310A legs spaced from one another and extending from the base 304A. The base 304A, the first leg 308A, and the second leg 310A define a mounting channel 312A for receiving the flange 20 of the vehicle 10 for securing and/or gripping the seal assembly 300 to the frame 14. The first body portion 302A further has an inner surface 322A which defines the mounting channel 312A and an outer surface 324A which at least partially defines an outer surface 324A of the first body portion 302A.

Similarly, the second body portion 302B has a closed end 304B and an open end 306B opposite the closed end 304B, with both the closed 304B and open 306B ends extending along a second body length BL2. The closed end 304B is further defined as the base 304B of the second body portion 302B. The second body portion 302B further has first 308B and second 310B legs spaced from one another and extending from the base 304B. The base 304B, the first leg 308B, and the second leg 310B define a mounting channel 312B for receiving the flange 20 of the vehicle 10 for securing and/or gripping the seal assembly 300 to the frame 14. The second body portion 302B further has an inner surface 322B which defines the mounting channel 312B and an outer surface 324B which at least partially defines an outer surface 324B of the second body portion 302B.

Each of the first 302A and second 302B body portions has first 303A, 303B and second 305A, 305B ends with the first end 303A of the first body portion 302A adjacent the second end 305B of the second body portion 302B to form a body interface 307. As described in further detail below, the molding material 390 is molded to the body interface 307 to join the first 302A and second 302B body portions together. When joined together, the outer surface 324A of the first body portion 302A and the outer surface 324B of the second body portion 302B defines the first axis of curvature A adapted to correspond with the contour 22 of the flange 20 of the vehicle 10.

Also in the second embodiment, the at least one sealing lip portion is further defined as first 328A and second 328B sealing lip portions. The first sealing lip portion 328A is co-extruded with the first body portion 302A to define a first notch segment 338A. The second sealing lip portion 328B is co-extruded with the second body portion 302B to define a second notch segment 338B. The first 338A and second 338B notch segments collectively form the notch 338 of the seal assembly 300 having a notch configuration. The first 338A and second 338B notch segments may have any suitable size and/or configuration. In an embodiment, the size of the first notch segment 338A is substantially the same as the size of the second notch segment 338B. Alternatively, the size of one of the notch segments 338A, 338B can be larger or smaller than the size of the other notch segment 338A, 338B. The element 156, having an element configuration corresponding to the notch configuration, is secured within the notch 338 in the same way as described above for the first embodiment of the seal assembly 100 to form the contour lip portion 192 of the external sealing lip 193.

In the second embodiment, the seal assembly 300 also has a first sealing flange 394A co-extruded with the first body portion 302A and extending transverse to the second leg 310A and spaced from the base 304A of the first body portion 302A. The seal assembly 300 further has a second sealing flange 394B co-extruded with the second body portion 302B and extending transverse to the second leg 310B and spaced from the base 304B of the second body portion 302B. The first 394A and second 394B sealing flanges partially define the window channel 396A, 396B for receiving the movable window closure member 18 of the vehicle 10.

Additionally, the first sealing flange 394A defines a first gap segment 402A and the second sealing flange 394B defines a second gap segment 402B. The first 402A and second 402B gap segments may have any suitable size and/or configuration. In an embodiment, the size of the first gap segment 402A is substantially the same as the size of the second gap segment 402B. Alternatively, the size of one of the gap segments 402A, 402B can be larger or smaller than the size of the other gap segment 402A, 402B. The first 402A and second 402B gap segments collectively form the gap 202 that in combination with the notch 338 allow curvature of the seal assembly 300 along the first axis of curvature A.

The seal assembly 300 further includes a first sealing flange 394A co-extruded with the first body portion 302A with the first sealing flange 394A extending transverse to the second leg 310A and the first sealing flange 394A spaced from the base 304A to partially define a window channel 396A for receiving the movable window closure member 18 of the vehicle 10. Additionally, the seal assembly 300 includes a second sealing flange 394B co-extruded with the second body portion 302B with the second sealing flange 394B extending transverse to the second leg 310B and the second sealing flange 394B spaced from the base 304B to partially define a window channel 396B for receiving the movable window closure member 18 of the vehicle 10. The first sealing flange 394A at least partially defines the first gap segment 402A that in combination with the first notch segment 338A and the second sealing flange 394B at least partially defines the second gap segment 402B that in combination with the second notch segment 338B allows curvature of the seal assembly 300 along the first axis of curvature A. For example, prior to molding, the co-extruded products 420A, 420B (one including the first body portion 302A, the first sealing lip portion 328A, and the first sealing flange 394A and the other including the second body portion 302B, the second sealing lip portion 328B, and the second sealing flange 394B) are positioned in the mold such that the co-extruded products 420A, 420B follow the curvature of the contour 22 of the vehicle flange 20. The presence of the notch 338 and the gap 402, in combination, allows or permits the co-extruded products 420A, 420B, when molded together, to be bent so that the seal assembly 300 can be formed to follow the curvature of the contour 22 of the vehicle flange 20.

In the embodiment shown, the seal assembly 300 further has at least one first sealing finger 408A extending from the first sealing flange 394A inwardly toward the window channel 396A, and at least one second sealing finger 408B extending from the second sealing flange 394B inwardly toward the window channel 396B. In this embodiment, the first sealing finger(s) 408A further defines the first gap segment 402A, and the second sealing finger(s) 408B further defines the second gap segment 402B.

It should be appreciated that the second embodiment of the seal assembly 300 may also include any or all of the other components/features of the seal assembly 100 described above in conjunction with FIGS. 2-10. In addition, modifications to the second embodiment of the seal assembly 300 are also contemplated. For example, the first co-extruded product 420A defines the entire notch 338 and the entire gap 402, and the second co-extruded product 420B defines none of the notch 338 and none of the gap 402. In another alternative configuration, the first and second co-extruded products 420A, 420B could together define the notch 338, while only one of the co-extruded products 420A, 420B defines the gap 402.

Figure 16:
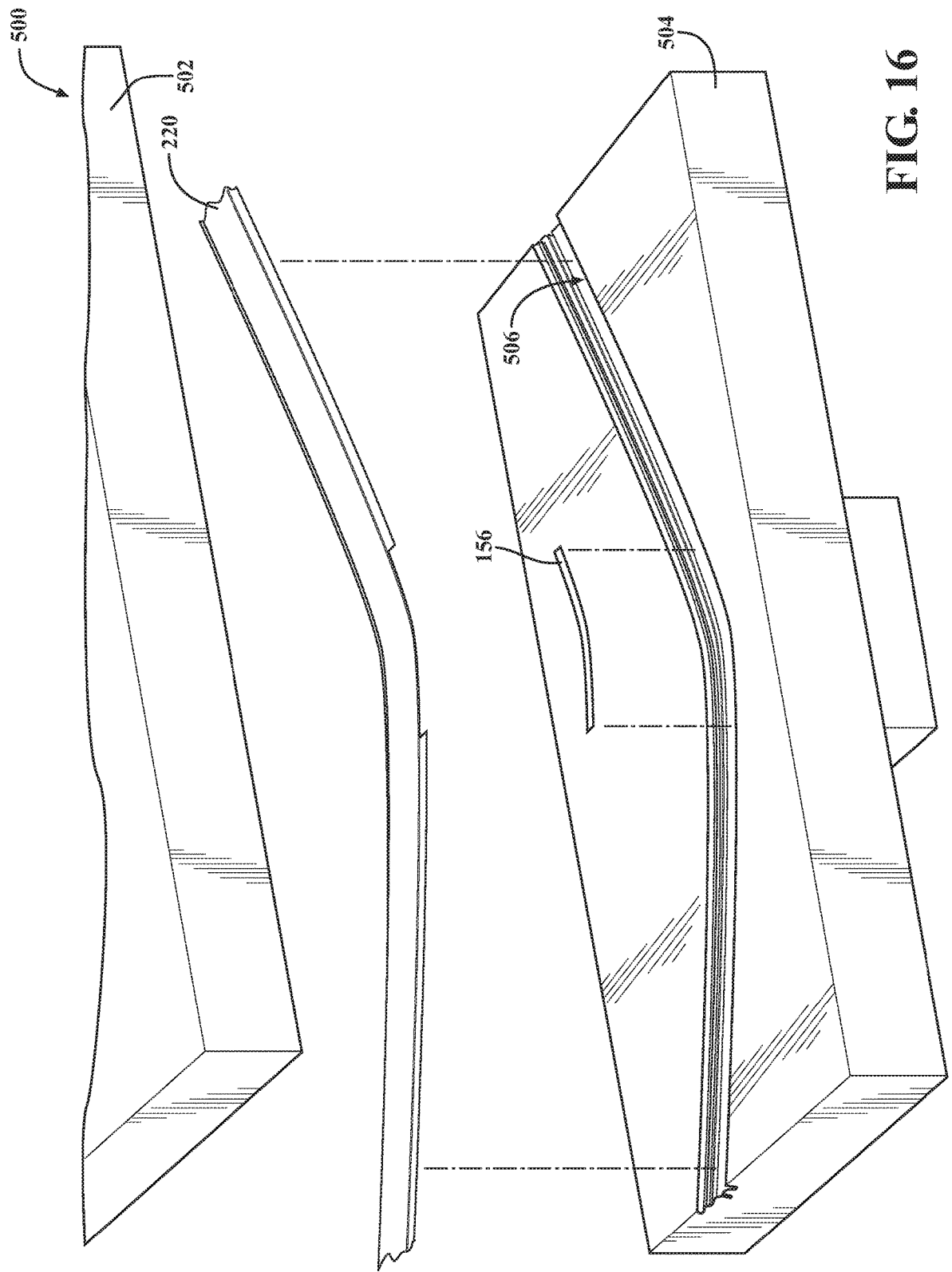
FIG. 16 a schematic illustration a portion of a mold including upper and lower mold halves in an open position and a mold cavity defined in the lower mold half.
Figure 17:
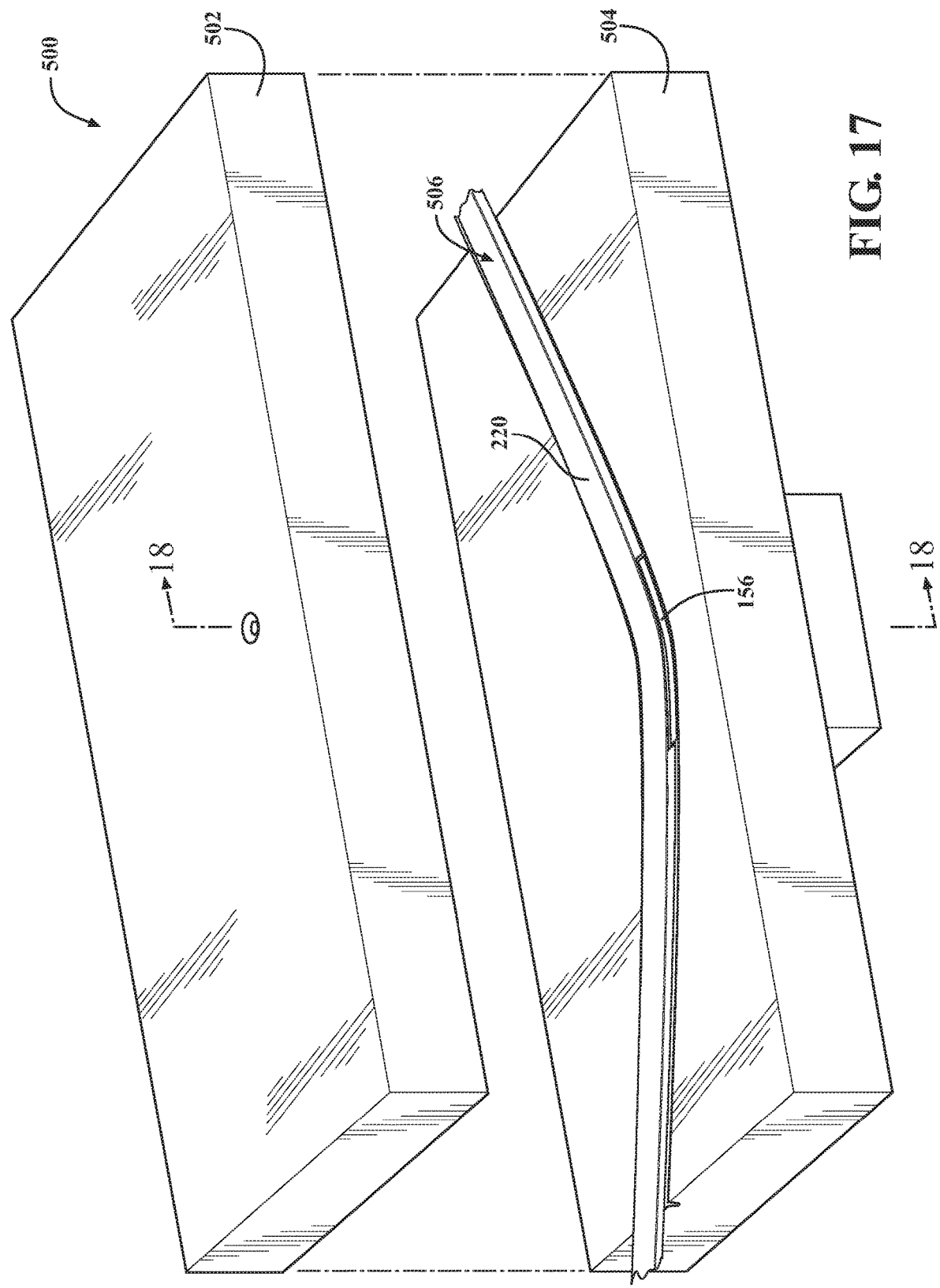
FIG. 17 is a schematic illustration of the mold with the upper and lower mold halves in an open position, with the element and the co-extruded product positioned within the mold cavity during the method of manufacturing the first embodiment of the seal assembly.
Figure 18:
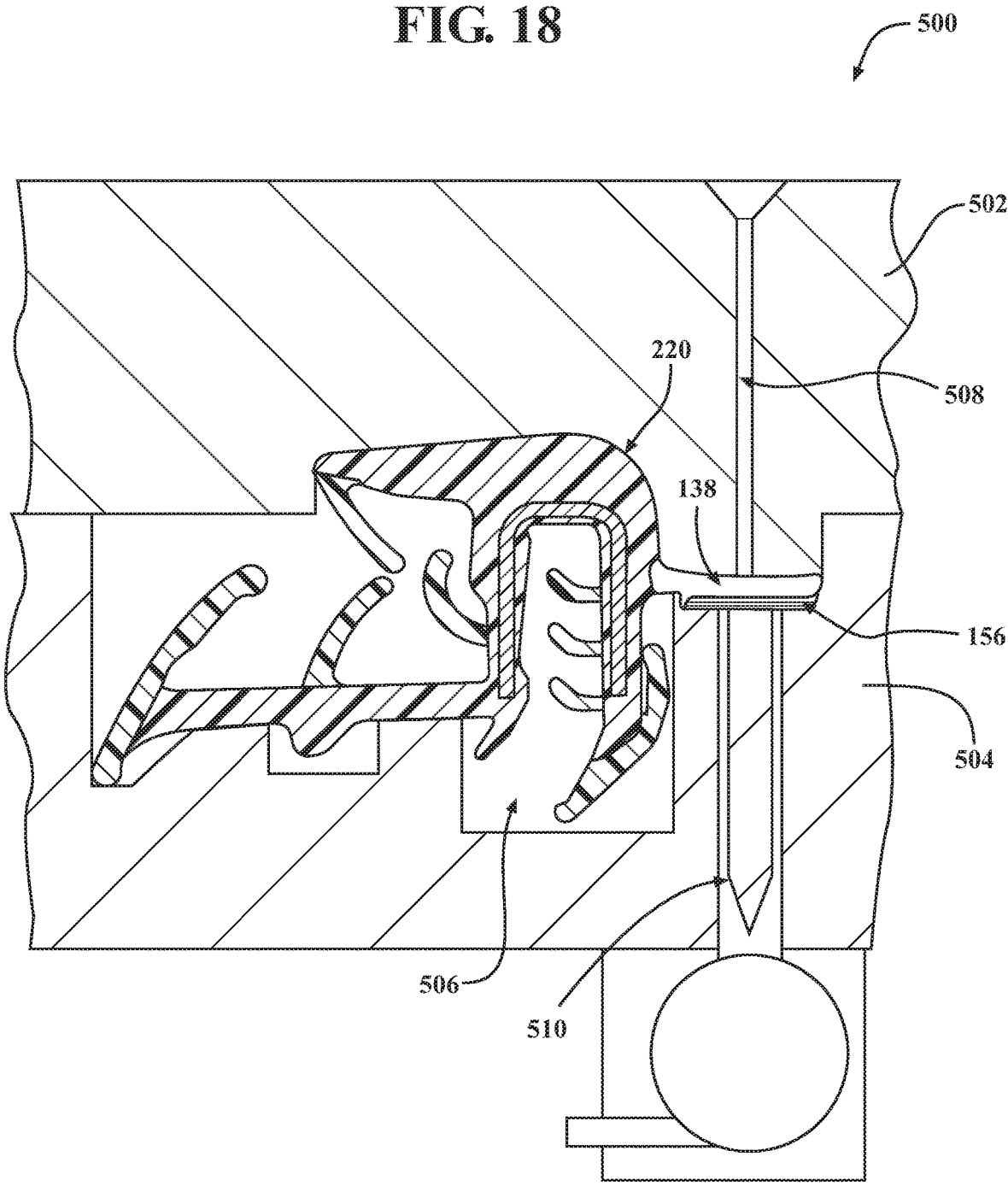
FIG. 18 is a cross-sectional view of the mold with the element and the co-extruded product positioned within the mold cavity taken along line 18-18 of FIG. 17. The cross-hatching of the element has been removed in FIG. 18 for purposes of simplifying the figure.

A method of manufacturing the seal assembly 100, 300 adapted to be coupled to the flange 20 of the vehicle 10 having the contour 22 is described below at least with reference to FIGS. 16-19. The method utilizes a mold 500 having upper 502 and lower 504 mold halves with the lower mold half 504 defining a mold cavity 506. As best shown in FIGS. 18 and 19, the upper half 502 of the mold defines an injection port 508 for receiving the molding material 190 from a source (not shown). Notably, the thickness of the injection port 508 is exaggerated for purposes of illustration. The mold 500 further has a vacuum source 510 in fluid communication with the mold cavity 506. The mold 500 is generically and/or schematically shown in FIGS. 16-19, and any suitable mold known in the art may be used to perform the method. The method will be described below for manufacturing the first embodiment of the seal assembly 100. Modifications to the method for manufacturing the second embodiment of the seal assembly 300 will be described afterwards.

The method of manufacturing the seal assembly 100 includes the step of extruding at least one body portion 102 having a base 104 and first 108 and second 110 legs spaced from one another and extending from the base 104, with the base 104, the first leg 108, and the second leg 110 defining a mounting channel 112 for receiving the flange 20 of the vehicle 10 and the base 104 defining an outer surface of the at least one body portion 102 with the outer surface defining a first axis of curvature A adapted to correspond with the contour 22 of the flange 20 of the vehicle 10. The method further includes the step of co-extruding at least one sealing lip portion 128 with the at least one body portion 102 to form a co-extruded product 220. In an embodiment, the method further includes the step of co-extruding a sealing flange 194 with the at least one body portion 102 with the sealing flange 194 extending transverse to the second leg 110 and spaced from the base 104 of the at least one body portion 102 to partially define the window channel 112 for receiving the window closure member 18 of the vehicle 10. In this embodiment, co-extrusion of the at least one body portion 102, the at least one sealing lip portion 128, and the sealing flange 194 forms the co-extruded product 220. It is to be appreciated that other features of the seal assembly 100, such as the sealing fingers 208, 210, 212, the internal sealing lip 214, etc., are also co-extruded with the at least one body portion 102 and become part of the co-extruded product 220. Co-extrusion may be performed utilizing any suitable extrusion method and/or equipment known in the art.

The method further includes the step of cutting a notch 138 in the at least one sealing lip portion 128 of the co-extruded product 220 with the notch 138 having a notch configuration. For example, once formed, the co-extruded product 220 may be cut utilizing any suitable cutting technique and/or equipment to form the notch 138 having the notch configuration in the at least one sealing lip portion 128. In an embodiment, the method further includes the step of cutting a gap 202 in the sealing flange 194 of the co-extruded product 220. Similarly, the gap 202 may be cut utilizing the same cutting technique and/or equipment as the notch 138.

The method further includes the step of forming an element 156 having an element configuration and front 158 and back 160 surfaces with the element configuration corresponding to at least part of the notch configuration. As previously mentioned, an embodiment of the element 156 includes a substrate 178 with an adhesive 184 deposited on one surface 180 and an anti-friction coating 186 deposited on the other surface 182, such as TaplaTape® Flock from Tapla Industries (Spain). The TaplaTape® may be cut utilizing any suitable cutting technique and/or equipment to form the element 156 having the element configuration. Alternatively, the element 156 could be pre-formed by selecting a suitable substrate material, such as a fabric, and depositing (such as spraying or coating) the anti-friction coating to one surface of the substrate and depositing (such as spraying or coating) the adhesive to the other surface of the substrate. Various other techniques for depositing the anti-friction coating and/or the adhesive to the substrate are also contemplated herein.

It is to be appreciated that the step of forming the element 156 is performed separately from the steps of extruding the at least one body portion 102 and the co-extruding the at least one sealing lip portion 128.

The method further includes the step of securing the element 156 inside the mold cavity 506 of the mold 500. Thereafter, the method includes the step of disposing the co-extruded product 220 into the mold cavity 506 such that the notch 138 is positioned about the element 156. This is illustrated in FIG. 16, where the element 156 is being positioned and secured within the mold cavity 506, and then the co-extruded product 220 is being disposed in the mold cavity 506. FIG. 17 shows the co-extruded product 220 and the element 156 positioned within the mold cavity 506 with the notch 138 positioned about the element 156.

Once positioned within the mold cavity 506, the method includes the step of lowering the upper mold half 502 to enclose the mold cavity 506. With the mold cavity 506 enclosed, the step of securing the element 156 inside the mold cavity 506 includes generating a vacuum inside the mold cavity 506 to maintain a position of the element 156 inside the mold cavity 506. In an embodiment, the vacuum is generated by the vacuum source 510 and is a partial or imperfect vacuum in which a portion of the air is removed from the mold cavity 506. Alternatively, the vacuum source 510 could generate a perfect vacuum in which the mold cavity 506 is completely devoid of air. In an alternative embodiment, the element 156 could be mechanically secured inside the mold cavity 506.

The method further includes the step of injecting a molding material 190 into the notch 138 against the back surface 160 of the element 156 to secure the element 156 in the notch 138 such that the element 156 and the molding material 190 define a contour lip portion 192 that in combination with the at least one sealing lip portion 128 defines an external sealing lip 193 of the seal assembly 100. For example, the molding material 190 is taken from a source, such as a storage vessel or receptacle, and is injected into the mold 500 through the injection port 508 and into the mold cavity 506. As shown in FIG. 18, the co-extruded product 220 is positioned about the element 156 within the mold cavity 506. FIG. 19 shows the molding material 190 being introduced into the mold cavity 506 through the injection port 508 to secure the element 156 within the notch 138 of the at least one sealing lip portion 128. It is to be appreciated that the position of the element 156 is maintained inside the mold cavity 506 (such as by a vacuum or by mechanical means) during and/or throughout the injecting step.

The injecting step includes securing the element 156 in the notch 138 by activating the adhesive 184 of the element 156 to facilitate bonding of the molding material 190 to the one surface of the element 156. With the application of heat during the injecting step, the adhesive 184 activates to facilitate bonding of the molding material 190 to the element 156. Additionally, the molding material 190 is melt-bonded to the back surface 160 of the element 156 and the at least one sealing lip portion 128 to secure the element 156 to the at least one sealing lip portion 128. In an embodiment, the injecting step is further defined as injecting the molding material to the back surface 160 of the element 156, across the notch 138, and into the gap 202 with the gap 202 and the notch 138 collectively allowing curvature of the seal assembly 100 along the first axis of curvature A. In this embodiment, the molding material 190 is melt-bonded to the back surface 160 of the element 156 and the at least one sealing lip portion 128 to secure the element 156 to the at least one sealing lip portion 128, and is melt-bonded to the sealing flange 194 to fill the gap 202.

Once the injecting step is complete and the molded product (which includes the co-extruded product 220 and the element 156 secured within the notch 138) is removed from the mold 500, the method includes the step of applying an anti-friction coating 154 on the at least one sealing lip portion 128. This may be accomplished by feeding the molded product through a flocking booth, where the anti-friction coating 154 is applied (such as sprayed) to the front surface 134 of the sealing lip portion 128.

The manufacturing method described above may also be used for forming the second embodiment of the seal assembly 300. In this embodiment of the method, the extruding step is further defined as extruding the first body portion 302A and extruding the second body portion 302B. The co-extruding step is further defined as co-extruding the first sealing lip portion 328A with the first body portion 302A to form a first co-extruded product 420A having first 303A and second 305A ends, and co-extruding the second sealing lip portion 328B with the second body portion 302B to form a second co-extruded product 420B having first 303B and second 305B ends. The disposing step is further defined as disposing the first 420A and second 420B co-extruded products into the mold cavity 506 such that the first end 303A of the first co-extruded product 420A is adjacent the second end 305B of the second co-extruded product 420B. The method further comprises the step of securing the first 420A and second 420B co-extruded products together with the molding material 390 during the injecting step. During this step, the molding material 390 melt-bonds the ends 303A, 305B together to join the first 420A and second 420B co-extruded products, as well as melt-bonds the element 156 to the sealing lip portions 328A, 328B, and fills the gap 402.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A seal assembly adapted to be coupled to a flange of a vehicle with the flange having a contour, said seal assembly comprising:
   at least one body portion having a base and first and second legs spaced from one another and extending from said base, with said base, said first leg, and said second leg defining a mounting channel for receiving the flange of the vehicle and said base defining an outer surface of said at least one body portion with said outer surface defining a first axis of curvature adapted to correspond with the contour of the flange of the vehicle;
   at least one sealing lip portion co-extruded with said at least one body portion with said sealing lip portion defining a notch having a notch configuration;
   an element disposed in said notch with said element having front and back surfaces and pre-formed to have an element configuration corresponding to at least a part of said notch configuration; and
   a molding material molded to said back surface of said element, secured to said at least one sealing lip portion within said notch, and extending across said notch, with said element and said molding material defining a contour lip portion that in combination with said at least one sealing lip portion defines an external sealing lip of said seal assembly.

2. The seal assembly as set forth in claim 1 wherein said element has an outer edge defining a second axis of curvature angularly offset from said first axis of curvature.

3. The seal assembly as set forth in claim 2 wherein said element further has an inner edge spaced from said outer edge with said inner edge defining a third axis of curvature aligned with said first axis of curvature and angularly offset from said second axis of curvature.

4. The seal assembly as set forth in claim 1 wherein said element configuration corresponds to said entire notch configuration.

5. The seal assembly as set forth in claim 1 wherein said at least one sealing lip portion has inner and outer edges with said inner edge attached to said at least one body portion and said notch is formed through said outer edge and extends toward but terminating prior to said inner edge to define a bonding region of the at least one sealing lip portion.

6. The seal assembly as set forth in claim 5 wherein said at least one sealing lip portion has first and second interior edges partially defining said notch and said element has first and second side edges with said first side edge of said element adjacent said first interior edge of said at least one sealing lip portion to define a first interface and said second side edge of said element adjacent said second interior edge of said at least one sealing lip portion to define a second interface.

7. The seal assembly as set forth in claim 6 wherein said at least one sealing lip portion further has a third interior edge extending between said first and second interior edges with said third interior edge defining a top surface of said bonding region with said top surface defining a bottom of said notch and said element has inner and outer edges with said inner edge of said element adjacent said third interior edge of said at least one sealing lip portion to define a third interface.

8. The seal assembly as set forth in claim 1 wherein said element includes a substrate having opposing surfaces with an adhesive on one of said surfaces and an anti-friction coating deposited on another one of said surfaces to define a coated element surface and said sealing lip portion has front and back surfaces, and further comprising an anti-friction coating deposited on said front surface of said sealing lip portion to form a coated lip surface with said coated lip surface and said coated element surface collectively forming a coated front surface of said external sealing lip.

9. The seal assembly as set forth in claim 1 further comprising a sealing flange co-extruded with said at least one body portion with said sealing flange extending transverse to said second leg and said sealing flange spaced from said base to partially define a window channel for receiving a window closure member of the vehicle, with said sealing flange at least partially defining a gap that in combination with said notch allows curvature of said seal assembly along said first axis of curvature.

10. The seal assembly as set forth in claim 9 further comprising at least one sealing finger extending from said sealing flange inwardly toward said window channel, with said at least one sealing finger further defining said gap.

11. The seal assembly as set forth in claim 9 wherein said molding material is further molded to said sealing flange to fill said gap and maintain said seal assembly with said curvature along said first axis of curvature.

12. The seal assembly as set forth in claim 1 wherein said at least one body portion is further defined as first and second body portions with each of said first and second body portions having first and second ends with said first end of said first body portion adjacent said second end of said second body portion to form a body interface with said molding material further molded to said body interface to join said first and second body portions together, and
wherein said at least one sealing lip portion is further defined as first and second sealing lip portions with said first sealing lip portion co-extruded with said first body portion defining a first notch segment and said second sealing lip portion co-extruded with said second body portion defining a second notch segment, with said first and second notch segments collectively forming said notch.

13. The seal assembly as set forth in claim 12 further comprising a first sealing flange co-extruded with said first body portion and extending transverse to said second leg and spaced from said base of said first body portion and a second sealing flange co-extruded with said second body portion with said second sealing flange extending transverse to said second leg and spaced from said base of said second body portion to partially define a window channel for receiving a window closure member of the vehicle, with said first sealing flange defining a first gap segment and said second sealing flange defining a second gap segment, with said first and second gap segments collectively forming a gap that in combination with said notch allow curvature of said seal assembly along said first axis of curvature.

14. A method of manufacturing a seal assembly adapted to be coupled to a flange of a vehicle with the flange having a contour with said method utilizing a mold having a mold cavity, said method comprising the steps of:
co-extruding at least one body portion having a base and first and second legs spaced from one another and extending from the base, with the base, the first leg, and the second leg defining a mounting channel for receiving the flange of the vehicle and the base defining an outer surface of the at least one body portion with the outer surface defining a first axis of curvature adapted to correspond with the contour of the flange of the vehicle;
co-extruding at least one sealing lip portion with the at least one body portion to form a co- extruded product;
cutting a notch in the at least one sealing lip portion of the co-extruded product with the notch having a notch configuration;
forming an element having an element configuration and front and back surfaces with the element configuration corresponding to at least part of the notch configuration;
positioning the element inside the mold cavity of the mold;
disposing the co-extruded product into the mold cavity such that the notch is positioned about the element; and
injecting a molding material into the notch against the back surface of the element to secure the element in the notch such that the element and the molding material define a contour lip portion that in combination with the at least one sealing lip portion defines an external sealing lip of the seal assembly.

15. The method as set forth in claim 14 wherein the step of forming the element is performed separately from the steps of extruding the at least one body portion and the co-extruding the at least one sealing lip portion.

16. The method as set forth in claim 14 wherein the element includes a substrate having opposing surfaces with an adhesive on one of the surfaces and an anti-friction coating deposited on another one of the surfaces to define a coated element surface and the injecting step includes securing the element in the notch by activating the adhesive of the element to facilitate bonding of the molding material to the one surface of the element.

17. The method as set forth in claim 14 further comprising the steps of:
co-extruding a sealing flange with the at least one body portion with the sealing flange extending transverse to the second leg and spaced from the base of the at least one body portion to partially define a window channel for receiving a window closure member of the vehicle; and
cutting a gap in the sealing flange, and wherein the injecting step is further defined as injecting the molding material to the back surface of the element, across the notch, and into the gap with the gap and the notch collectively allow curvature of said seal assembly along the first axis of curvature.

18. The method as set forth in claim 14 wherein the step of positioning the element inside the mold cavity includes generating a vacuum inside the mold cavity to maintain a position of the element inside the mold cavity during the injecting step to secure the element inside the mold cavity.

19. The method as set forth in claim 14 wherein the at least one body portion is further defined as first and second body portions and the extruding step is further defined as extruding the first body portion and extruding the second body portion, wherein the at least one sealing lip portion is further defined as first and second sealing lip portions and the co-extruding step is further defined as co-extruding the first sealing lip portion with the first body portion to form a first-co-extruded product having first and second ends and co-extruding the second sealing lip portion with the second body portion to form a second co-extruded product having first and second ends, and wherein the disposing step is further defined as disposing the first and second co-extruded products into the mold cavity such that the first end of the first co-extruded product is adjacent the second end of the second co-extruded product, and further comprising the step of securing the first and second co-extruded products together with the molding material during the injecting step.

* * * * *